United States Patent
Sasaki et al.

(10) Patent No.: US 7,081,272 B2
(45) Date of Patent: Jul. 25, 2006

(54) COATING COMPOSITION FOR FORMING LOW-REFRACTIVE INDEX THIN LAYERS

(75) Inventors: Yoro Sasaki, Fuji (JP); Hiroyuki Hanahata, Shizuoka (JP); Takaaki Ioka, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/496,870

(22) PCT Filed: Dec. 13, 2002

(86) PCT No.: PCT/JP02/13081

§ 371 (c)(1),
(2), (4) Date: May 26, 2004

(87) PCT Pub. No.: WO03/052003

PCT Pub. Date: Jun. 26, 2003

(65) Prior Publication Data

US 2005/0031791 A1    Feb. 10, 2005

(30) Foreign Application Priority Data

Dec. 14, 2001   (JP)   .............................. 2001-381084
Feb. 21, 2002   (JP)   .............................. 2002-045098

(51) Int. Cl.
    *B05D 3/10*   (2006.01)
(52) U.S. Cl. ............ 427/271; 106/287.13; 106/287.16; 427/352; 521/61; 521/63; 528/14; 528/21
(58) Field of Classification Search ..................... None
    See application file for complete search history.

(56) References Cited

U.S. PATENT DOCUMENTS 4,818,732 A * 4/1989 Fox et al. ..................... 501/81
6,787,191 B1 * 9/2004 Hanahata et al. ........... 427/387
2004/0091411 A1 * 5/2004 Modrek-Najafabadi ..... 423/338

FOREIGN PATENT DOCUMENTS

| JP | 3-139526 A | * | 6/1991 |
| JP | 3-199043 A |   | 8/1991 |
| JP | 7-140302 A |   | 6/1995 |
| JP | 8-319109 A |   | 12/1996 |
| JP | 10-158012 A |  | 6/1998 |
| JP | WO 01/74957 | * | 10/2001 |

OTHER PUBLICATIONS

Aldrich's catalogue entitled "Handbook of Fine Chemicals and Laboratory Equipment."
"Revised 2nd edition, Handbook of Chemistry, Fundamentals Part II" edited by The Chemical Society of Japan and published by Maruzen Co., Ltd., Japan in 1975, and a partial English translation thereof.

* cited by examiner

Primary Examiner—Marc S. Zimmer
(74) Attorney, Agent, or Firm—Birch, Stewart, Kolasch & Birch, LLP

(57) ABSTRACT

A composition comprising a fluid, silica precursor (A) obtained by subjecting alkoxysilane(s) to hydrolysis/polycondensation in the presence of an acid catalyst, a basic compound (B) having a basic hydroxyl group and/or a basic nitrogen atom, wherein the pH of a 0.1 N aqueous solution of compound (B) is 11 or more, and the vapor pressure of compound (B) is 1.3 kPa or lower at 100° C., and an organic compound (C) having a boiling point of 100° C. or higher, compound (C) being compatible with silica precursor (A), wherein the amount of compound (B) is from 0.0015 to 0.5 mol, in terms of the total molar amount of the basic hydroxyl groups and the basic nitrogen atoms in compound (B), per mole of Si atoms contained in silica precursor (A).

15 Claims, 2 Drawing Sheets

COATING COMPOSITION FOR FORMING LOW-REFRACTIVE INDEX THIN LAYERS

BACKGROUND OF THE INVENTION

1. Field of the Invention

The present invention relates to a coating composition for use in forming a thin film having a low refractive index. More particularly, the present invention is concerned with a coating composition comprising a fluid, silica precursor (A) obtained by subjecting a specific alkoxysilane to hydrolysis and polycondensation in the presence of an acid catalyst, a basic compound (B) having a basic hydroxyl group and/or a basic nitrogen atom, wherein the pH of a 0.1N aqueous solution of the basic compound (B) is 11 or more and the vapor pressure of the basic compound (B) is 1.3 kPa or lower as measured at 100° C., and an organic compound (C) having a boiling point of 100° C. or higher, the organic compound (C) being compatible with the fluid, silica precursor (A), wherein the amount of the basic compound (B) is from 0.0015 to 0.5 mol, in terms of the total molar amount of the basic hydroxyl groups and the basic nitrogen atoms in the basic compound (B), per mole of Si atoms contained in the fluid, silica precursor (A). The present invention is also concerned with a porous silica thin film obtained using the above-mentioned coating composition. The porous silica thin film of the present invention has a low refractive index, a high light transmittance and a high strength, so that it can be advantageously used as an antireflection film.

2. Prior Art

Conventionally, as an antireflection film for coating an optical part, a lens (e.g., lenses of glasses) or a display screen, there are known an anti-reflection film having a single-layer structure and an antireflection film having a multilayer structure. An antireflection film having a single-layer structure or a double-layer structure has disadvantageously high reflectance. Therefore, it has been considered to be more desirable to use an antireflection film having a laminated structure composed of three different layers having different refractive indices. However, when such an antireflection film is produced by any of the conventional methods, such as vacuum deposition and dip coating, disadvantages are caused such that the production process is cumbersome and that the productivity is low.

For solving the above-mentioned problems, it has been attempted to reduce the refractive index of a single-layer antireflection film. It is generally known that, when the refractive index of a substrate having formed thereon a single-layer antireflection film is defined as $n_s$ and the refractive index of the single-layer antireflection film is defined as n, the minimum value of the reflectance R of the antireflection film is expressed as $(n_s-n^2)^2/(n_s+n^2)^2$, with the proviso that $n_s>n$. The minimum value of reflectance R (i.e., $(n_s-n^2)^2/(n_s+n^2)^2$) is a function which becomes minimum when $n^2=n_2$ (i.e., when $n=(n_s)^{1/2}$), which means that the reflectance R becomes smaller as the refractive index n of the single-layer antireflection film becomes closer to $(n_s)^{1/2}$. Materials of conventional light transmitting optical substrates include glass ($n_s$=about 1.52), polymethyl methacrylate ($n_s$=about 1.49), polyethylene terephthalate ($n_s$=about 1.54) and triacetyl cellulose ($n_s$=about 1.49). Accordingly, the appropriate refractive index n of a single-layer antireflection film is within the range of from 1.22 to 1.24. More specifically, for lowering the reflectance R of a single-layer antireflection film formed on the conventional light transmitting optical substrate, it is desired that the refractive index n of the single-layer antireflection film is within the range of from 1.22 to 1.24 or as close to this range as possible.

Silica has an excellent light transmittance over a wide range of wavelength, and has a relatively low refractive index, namely a refractive index of about 1.45. Further, a porous silica has an even lower refractive index. As examples of the method for producing a porous silica thin film having a low refractive index using porous silica particles, the following methods are known.

(1) A method in which porous silica particles are prepared, and the prepared porous silica particles are immobilized on a substrate using a binder, to thereby form a porous silica thin film having a low refractive index on the substrate, in which the silica particles are bonded to the substrate via the binder (Unexamined Japanese Patent Application Laid-Open Specification Nos. Hei 3-78946, Hei 6-345487 and Hei 7-48527).

(2) A method in which a thin film comprising a silica particle sol (containing a large amount of silanol groups, and having a relatively low condensation degree) is formed, followed by curing the thin film so as to convert the silica particle sol into solid silica particles, wherein voids are formed between the mutually adjacent solid silica particles (i.e., pores are formed in the thin film) (Unexamined Japanese Patent Application Laid-Open Specification No. 2001-115028).

(3) A method in which a thin film composed of a plurality of components (including porous silica particles) is formed, followed by curing the thin film, wherein pores are formed in the thin film by utilizing the difference between the shrinking ratios of the components (Unexamined Japanese Patent Application Laid-Open Specification Nos. Sho 62-17044, Hei 6-299091 and Hei 8-319109).

However, the above-mentioned methods (1) to (3) have the following problems.

In method (1) above, it is necessary to use a binder to improve the adhesion between the porous silica particles and the adhesion of the porous silica particles to the optical substrate, so as to improve the strength of the porous silica thin film. Due to the use of such a binder, it is impossible to improve the porosity of the porous silica thin film. Therefore, by this method, it is impossible to obtain a porous silica thin film having a low refractive index and a low reflectance.

In method (2) above, for obtaining a porous silica thin film having a desired porosity, it is necessary to cure the thin film of silica particle sol at a high temperature to increase the condensation degree of silica, so as to increase the shrinking ratios of the solid silica particles, thereby increasing the porosity of the thin film to a desired level. Therefore, there is a problem in that, when an optical sheet or film having a low heat distortion temperature is used as a substrate, the curing of the thin film cannot be conducted at a satisfactorily high temperature and, hence, it is impossible to obtain a porous silica film having a satisfactory strength (in terms of the pencil hardness of the thin film and the adhesion strength between the substrate and the thin film).

In method (3) above, as components of the thin film, a linear chain silica polymer produced in the presence of an acid catalyst and porous silica particles produced in the presence of a basic catalyst are used. In method (3), for increasing the porosity of the thin film, it is necessary to increase not only the difference between the shrinking ratios of the components of the thin film, but also the porous silica particle content of the thin film. As a result, scattering of light markedly occurs due to the large amount of porous silica particles, thereby causing a problem that the light transmittance of the thin film is lowered, namely, the haze exceeds 1.

Thus, by the above-mentioned methods (1) to (3), it was impossible to form a porous silica thin film on an optical sheet or film, which porous silica thin film has a low refractive index, a high light transmittance and a high strength.

On the other hand, as an example of the method for producing a porous silica thin film having a low refractive index and a high light transmittance without using porous silica particles, the following method is known.

(4) A method in which a thin film composed of a plurality of components (including an alkoxysilane or a hydrolysis/polycondensation product thereof and at least one pore-forming agent) is formed, followed by extraction of the pore-forming agent from the thin film, thereby forming uniform pores in the thin film, wherein each of the pores has a diameter smaller than the wavelength of a visible light (Unexamined Japanese Patent Application Laid-Open Specification No. Hei 1-312501 (corresponding to U.S. Pat. Nos. 5,116,644 and 5,181,142) and Unexamined Japanese Patent Application Laid-Open Specification Nos. Hei 3-199043, Hei 7-140302 and Hei 10-158012).

However, the techniques disclosed in the above-mentioned patent documents (describing the method (4) above) have the following problems.

In the above-mentioned Unexamined Japanese Patent Application Laid-Open Specification No. Hei 3-199043, a coating liquid containing a monoalkyltrialkoxysilane, a polyether and a solvent (mixed solvent containing water, ethanol and 1-butanol) is prepared, and the prepared coating liquid is applied to a substrate to form a thin film on the substrate. Then, the thin film is cured, and the polyether is extracted with ethanol from the cured thin film so as to form pores in the thin film. However, in this document, an inorganic or organic acid is used as a cure accelerating catalyst, so that the thin film cannot be cured to a satisfactory level, and thus, the strength of the thin film becomes unsatisfactory. When the polyether is extracted from such a thin film, the thin film is swollen, and is delaminated from the substrate.

With respect to the above-mentioned Unexamined Japanese Patent Application Laid-Open Specification No. Hei 7-140302, in the first step of the method disclosed in this patent document, a thin film of a coating composition comprising an alkoxysilane is formed on a substrate and, then, the alkoxysilane is subjected to hydrolysis and polycondensation in the absence of a catalyst, so that the resultant thin film contains only a small amount of silica polymers having linear structures. Therefore, in the second step in which the obtained thin film is cured in the presence of a basic catalyst, it is impossible to form a strong three-dimensional silica network in the thin film, so that the strength of the thin film becomes unsatisfactory. Due to the unsatisfactory strength of the thin film, shrinkage of the thin film is likely to occur during the extraction of the pore-forming agent from the thin film and the subsequent drying of the thin film, so that the refractive index of the thin film becomes unsatisfactory.

The present inventors made studies with respect to the method disclosed in the above-mentioned Unexamined Japanese Patent Application Laid-Open Specification No. Hei 7-140302, and have found the following. When a basic catalyst is also used in the first step of the above-mentioned method, where an alkoxysilane is subjected to hydrolysis and polycondensation, the porous silica particles are formed in the thin film. However, in the resultant film, a chain silica polymer is not formed in the thin film. Due to the absence of a chain silica polymer, a uniform silica/pore-forming agent complex is not formed. Therefore, even when the pore-forming agent is extracted from the thin film to form pores in the thin film, the thin film still contains large porous silica particles which cause scattering of the light, thereby leading to the lowering of the light transmittance of the thin film. Further, with respect to the method described this patent document, there is a case where a thin film cannot be formed on an optical substrate because of a precipitation which occurs in the coating composition for forming the thin film (see Comparative Example 8 of the present application).

In the above-mentioned Unexamined Japanese Patent Application Laid-Open Specification No. Hei 10-158012, a method is described in which the hydrolysis and polycondensation of an alkoxysilane are performed in the presence of an acid catalyst, followed by addition of aqueous ammonia as a basic curing catalyst, thereby obtaining a coating composition for forming a porous silica thin film. However, when such a coating composition is coated on an optical sheet or film, so as to form a porous silica thin film on the optical sheet or film, the basic curing catalyst volatilizes from the thin film (i.e., the basic catalyst content of the thin film is lowered) and, hence, the condensation of silica in the thin film would not satisfactorily proceed. Therefore, the resultant porous silica thin film suffers disadvantages that the thin film is delaminated from the optical substrate during the extraction of the pore-forming polymer (organic polymer having an amide bond) from the thin film, and that the thin film gets shrunk after the drying thereof. Thus, by the method of this patent document, it is impossible to form a thin film having a low refractive index, and the obtained thin film has no antireflection effect.

As apparent from the above, by the conventional methods, it has been impossible to obtain a porous silica thin film, which has a low refractive index, a high light transmittance and a high strength. Therefore, there has been a demand for the development of such a porous silica thin film.

SUMMARY OF THE INVENTION

In this situation, the present inventors have made extensive and intensive studies with a view toward solving the above-mentioned problems accompanying the prior art, and developing a porous silica thin film having a low refractive index, a high light transmittance and a high strength. As a result, it has unexpectedly been found that a porous silica thin film having the above-mentioned excellent properties can be obtained from a coating composition comprising a fluid, silica precursor (A) obtained by subjecting a specific alkoxysilane to hydrolysis and polycondensation in the presence of an acid catalyst, a basic compound (B) having a basic hydroxyl group and/or a basic nitrogen atom, in which the pH of a 0.1N aqueous solution of the basic compound (B) is 11 or more and the vapor pressure of the basic compound (B) is 1.3 kPa or lower as measured at 100° C., and an organic compound (C) having a boiling point of 100° C. or higher, the organic compound (C) being compatible with the fluid, silica precursor (A), wherein the amount of the basic compound (B) is from 0.0015 to 0.5 mol, in terms of the total molar amount of the basic hydroxyl groups and the basic nitrogen atoms in the basic compound (B), per mole of Si atoms contained in the fluid, silica precursor (A). The present invention has been completed, based on this novel finding.

Accordingly, it is an object of the present invention to provide a coating composition for use in producing a porous silica thin film having a low refractive index, a high light transmittance and a high strength.

It is another object of the present invention to provide a porous silica thin film having a low refractive index, a high light transmittance and a high strength, which is obtained from the above-mentioned coating composition.

The foregoing and other objects, features and advantages of the present invention will be apparent from the following description and appended claims taken in connection with the accompanying drawings.

DETAILED DESCRIPTION OF THE INVENTION

Figure 1:
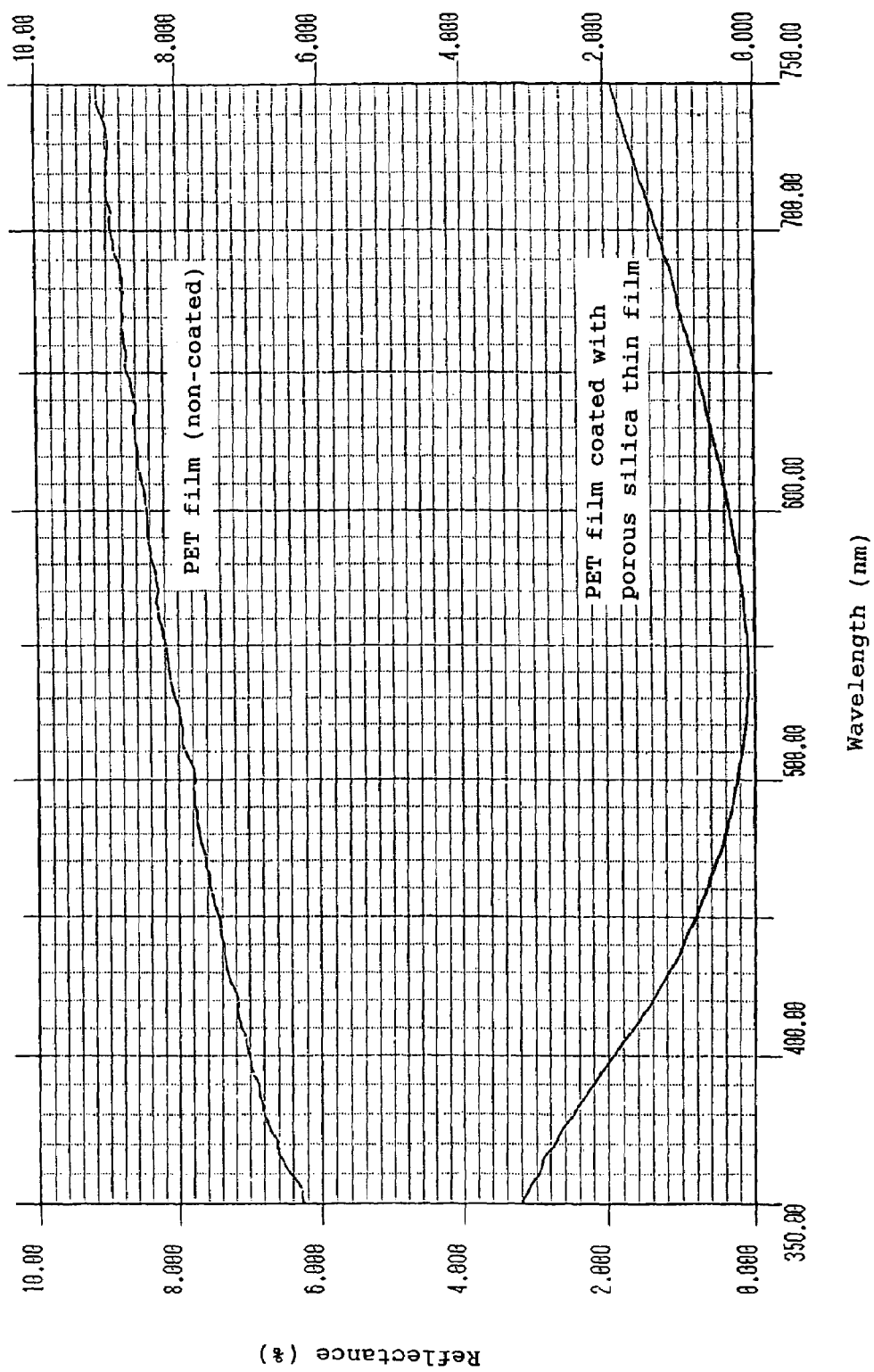
FIG. 1 is a chart showing the refractive index of each of an uncoated polyethylene terephthalate (PET) film and a coated PET film (coated with a porous silica thin film) obtained in Example 1.

In one aspect of the present invention, there is provided a coating composition comprising:

a fluid, silica precursor (A) obtained by subjecting at least one alkoxysilane to hydrolysis and polycondensation in the presence of an acid catalyst, the alkoxysilane being selected from the group consisting of first alkoxysilanes, each independently represented by the following formula (1):

   (1)

wherein each $R^1$ independently represents a hydrogen atom, a $C_1$–$C_{10}$ alkyl group, a $C_6$–$C_{10}$ aryl group, a vinyl group, a $C_3$–$C_{10}$ organic group having a vinyl group, a $C_4$–$C_{10}$ organic group having a (meth)acryloyl group or a $C_3$–$C_{10}$ organic group having an epoxy group, each $R^2$ independently represents a $C_1$–$C_6$ alkyl group, and n represents an integer of from 0 to 2, and second alkoxysilanes, each independently represented by the following formula (2):

   (2)

wherein each $R^3$ independently represents a $C_1$–$C_6$ alkyl group, R represents a $C_1$–$C_6$ alkylene group or a $C_6$–$C_{10}$ arylene group, and m represents 0 or 1, a basic compound (B) having at least one member selected from the group consisting of a basic hydroxyl group and a basic nitrogen atom, wherein the pH of a 0.1 N aqueous solution of the basic compound (B) is 11 or more, and the vapor pressure of the basic compound (B) is 1.3 kPa or lower as measured at 100° C., and an organic compound (C) having a boiling point of 100° C. or higher, the organic compound (C) being compatible with the fluid, silica precursor (A), wherein the amount of the basic compound (B) is from 0.0015 to 0.5 mol, in terms of the total molar amount of the basic hydroxyl groups and the basic nitrogen atoms in the basic compound (B), per mole of Si atoms contained in the fluid, silica precursor (A).

For easy understanding of the present invention, the essential features and various preferred embodiments of the present invention are enumerated below.

1. A coating composition comprising:

a fluid, silica precursor (A) obtained by subjecting at least one alkoxysilane to hydrolysis and polycondensation in the presence of an acid catalyst, the alkoxysilane being selected from the group consisting of first alkoxysilanes, each independently represented by the following formula (1):

   (1)

wherein each $R^1$ independently represents a hydrogen atom, a $C_1$–$C_{10}$ alkyl group, a $C_6$–$C_{10}$ aryl group, a vinyl group, a $C_3$–$C_{10}$ organic group having a vinyl group, a $C_4$–$C_{10}$ organic group having a (meth)acryloyl group or a $C_3$–$C_{10}$ organic group having an epoxy group, each $R^2$ independently represents a $C_1$–$C_6$ alkyl group, and n represents an integer of from 0 to 2, and second alkoxysilanes, each independently represented by the following formula (2):

   (2)

wherein each $R^3$ independently represents a $C_1$–$C_6$ alkyl group, $R^4$ represents a $C_1$–$C_6$ alkylene group or a $C_6$–$C_{10}$ arylene group, and m represents 0 or 1, a basic compound (B) having at least one member selected from the group consisting of a basic hydroxyl group and a basic nitrogen atom, wherein the pH of a 0.1 N aqueous solution of the basic compound (B) is 11 or more, and the vapor pressure of the basic compound (B) is 1.3 kPa or lower as measured at 100° C., and an organic compound (C) having a boiling point of 100° C. or higher, the organic compound (C) being compatible with the fluid, silica precursor (A), wherein the amount of the basic compound (B) is from 0.0015 to 0.5 mol, in terms of the total molar amount of the basic hydroxyl groups and the basic nitrogen atoms in the basic compound (B), per mole of Si atoms contained in the fluid, silica precursor (A).

2. The coating composition according to item 1 above, wherein the fluid, silica precursor (A) has a weight average molecular weight of from 1,500 to 200,000.

3. The coating composition according to item 1 or 2 above, wherein the organic compound (C) has at least one group selected from the group consisting of an ether group, an ester group, a carbonyl group, a carboxyl group, a carbonate group, an amide group and a hydroxyl group.

4. The coating composition according to item 3 above, wherein the organic compound (C) is a polyhydric alcohol or a saccharide, each of which has at least three hydroxyl groups, or an ester obtained by esterifying at least one of the hydroxyl groups of the polyhydric alcohol or saccharide.

5. The coating composition according to item 4 above, wherein, in the organic compound (C), which is a polyhydric alcohol, a saccharide or an ester, the atomic ratio of oxygen to carbon is 0.5 or more.

6. The coating composition according to item 3 above, wherein the organic compound (C) is at least one polymer selected from the group consisting of a polyether, a polyester, a polycarbonate, a polyamide, cellulose, a polyvinyl alcohol, a polyvinyl ether, a polyvinylpyrrolidone, a polyacrylamide and a polyacrylic acid.

7. The coating composition according to any one of items 1 to 6 above, wherein the acid catalyst is a cation exchange resin.

8. The coating composition according to any one of items 1 to 7 above, wherein the basic compound (B) is at least one compound selected from the group consisting of sodium hydroxide, potassium hydroxide, a tetraalkylammonium hydroxide, and a polyalkyleneimine having a weight average molecular weight of 130 or more.

9. The coating composition according to any one of items 1 to 8 above, wherein the amount of the basic compound (B) is from 0.005 to 0.08 mol, in terms of the total molar amount of the basic hydroxyl groups and the basic nitrogen atoms in the basic compound (B), per mole of Si atoms contained in the fluid, silica precursor (A).

10. The coating composition according to any one of items 1 to 9 above, which further comprises a solvent (D) for a mixture of the fluid, silica precursor (A), the basic compound (B) and the organic compound (C).

11. The coating composition according to item 10 above, wherein the solvent (D) comprises a high boiling point solvent having a hydroxyl group and having a boiling point of 100° C. or higher in an amount of 5% by weight or more, based on the weight of the coating composition.

12. The coating composition according to any one of items 1 to 11 above, which further comprises a tetraalkylammonium salt (E) in an amount of from 1 to 50 parts by weight, relative to 100 parts by weight of the fluid, silica precursor (A).

13. The coating composition according to any one of items 1 to 12 above, which is for use in forming an antireflection film.

14. A porous silica thin film obtained by a method comprising the steps of:

(1) applying the coating composition of any one of items 1 to 13 above onto a substrate to form a thin film of the composition on the substrate, the thin film comprising the fluid, silica precursor (A) having dispersed therein the basic compound (B) and the organic compound (C), (2) curing the thin film to obtain a cured thin film in which the fluid, silica precursor (A) has been converted to silica, and (3) subjecting the cured thin film to an extraction with a solvent to remove the organic compound (C) from the cured thin film, thereby obtaining a porous silica thin film.

15. The porous silica thin film according to item 14 above, wherein the solvent used for the extraction in the step (3) is a polar solvent.

Hereinbelow, the present invention is described in detail.

The coating composition of the present invention comprises the following essential components: a fluid, silica precursor (A), a basic compound (B) and an organic compound (C).

Firstly, fluid, silica precursor (A) is described below.

Fluid, silica precursor (A) is obtained by subjecting at least one alkoxysilane to hydrolysis and polycondensation in the presence of an acid catalyst, wherein the alkoxysilane is selected from the group consisting of first alkoxysilanes, each independently represented by the following formula (1):

wherein each $R^1$ independently represents a hydrogen atom, a $C_1$–$C_{10}$ alkyl group, a $C_6$–$C_{10}$ aryl group, a vinyl group, a $C_3$–$C_{10}$ organic group having a vinyl group, a $C_4$–$C_{10}$ organic group having a (meth)acryloyl group or a $C_3$–$C_{10}$ organic group having an epoxy group, each $R^2$ independently represents a $C_1$–$C_6$ alkyl group, and n represents an integer of from 0 to 2, and second alkoxysilanes, each independently represented by the following formula (2):

$$(R^3O)_3Si—(R^4)_m—Si(OR^3)_3 \quad (2)$$

wherein each $R^3$ independently represents a $C_1$–$C_6$ alkyl group, $R^4$ represents a $C_1$–$C_6$ alkylene group or a $C_6$–$C_{10}$ arylene group, and m represents 0 or 1.

With respect to the first alkoxysilanes represented by formula (1) above, an explanation is made below.

In the present invention, the first alkoxysilane of formula (1) above in which n is 0 (that is, the first alkoxysilane represented by the formula: $Si(OR^2)_4$) is referred to as a "tetrafunctional alkoxysilane". The first alkoxysilane of formula (1) above in which n is 1 (that is, the first alkoxysilane represented by the formula: $R^1Si(OR^2)_3$) is referred to as a "trifunctional alkoxysilane". The alkoxysilane of formula (1) above in which n is 2 (that is, the alkoxysilane represented by the formula: $R^1_2Si(OR^2)_2$) is referred to as a "bifunctional alkoxysilane".

Examples of $C_1$–$C_{10}$ alkyl groups as $R^1$ in formula (1) above include a methyl group, an ethyl group, a propyl group, an isobutyl group and a cyclohexyl group.

Examples of $C_6$–$C_{10}$ aryl groups as R in formula (1) above include a phenyl group and a tolyl group.

Examples of vinyl group-containing $C_3$–$C_{10}$ organic groups as $R^1$ in formula (1) above include an allyl group, a 1-propenyl group, a 1-butenyl group, a 2-butenyl group and a 3-butenyl group.

Examples of (meth)acryloyl group-containing $C_4$–$C_{10}$ organic groups as $R^1$ in formula (1) above include an acryloxymethyl group, an acryloxyethyl group, an acryloxypropyl group, a methacryloxymethyl group, a methacryloxyethyl group and a methacryloxypropyl group.

Examples of epoxy group-containing $C_3$–$C_{10}$ organic groups as $R^1$ in formula (1) above include a 2,3-epoxypropyl group, a 3,4-epoxybutyl group, a 4,5-epoxypentyl group, a 5,6-epoxyhexyl group, a 3,4-epoxycyclohexyl group and a 3-glycidoxypropyl group.

Examples of $C_1$–$C_6$ alkyl groups as $R^2$ in formula (1) above include a methyl group, an ethyl group, a propyl group, an isopropyl group, an isobutyl group and a cyclohexyl group.

Specific examples of the above-mentioned tetrafunctional alkoxysilanes include tetramethoxysilane, tetraethoxysilane, tetra(n-propoxy)silane, tetraisopropoxysilane, tetra(n-butoxy)silane and tetra(t-butoxy)silane.

Specific examples of the above-mentioned trifunctional alkoxysilanes include trimethoxysilane, triethoxysilane, methyltrimethoxysilane, methyltriethoxysilane, ethyltrimethoxysilane, etyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane, allyltriethoxysilane, γ-acryloxypropyltrimethoxysilane, γ-methacryloxypropyltrimethoxysilane and γ-glycidoxypropyltrimethoxysilane.

Specific examples of the above-mentioned bifunctional alkoxysilanes include dimethyldimethoxysilane, dimethyldiethoxysilane, diphenyldimethoxysilane and diphenyldiethoxysilane.

The above-mentioned alkoxysilanes can be used individually or in combination. Among the above-mentioned alkoxysilanes, preferred are tetramethoxysilane, tetraethoxysilane, trimethoxysilane, triethoxysilane, methyltrimethoxysilane, methyltriethoxysilane, dimethyldimethoxysilane and dimethyldiethoxysilane.

Next, an explanation is made below with respect to the second alkoxysilanes represented by formula (2) above.

The second alkoxysilane is an alkoxysilane in which two trifunctional alkoxysilanes are bonded to each other directly or through an alkylene group or an arylene group.

Specific examples of $C_1$–$C_6$ alkyl groups as $R^3$ in formula (2) above include a methyl group, an ethyl group, a propyl group, an isobutyl group and a cyclohexyl group.

Specific examples of $C_1$–$C_6$ alkylene groups as $R^4$ in formula (2) above include a methylene group, an ethylene group, a propylene group, a butylene group, an isobutylene group and a cyclohexyl group.

Specific examples of $C_6$–$C_{10}$ arylene groups as $R^4$ in formula (2) above include a phenylene group, a 2-methyl-1,4-phenylene group and a 2,5-dimethyl-1,4-phenylene group.

Specific examples of the second alkoxysilanes include bis(trimethoxysilyl)methane, bis(triethoxysilyl)methane, 1,2-bis(trimethoxysilyl)ethane, 1,2-bis(triethoxysilyl)ethane, 1,4-bis(trimethoxysilyl)benzene, 1,4-bis(triethoxysilyl)benzene, bis(trimethoxy)disilane and bis(triethoxy)disilane. These alkoxysilanes may be used individually or in combination. Among the above-mentioned alkoxysilanes, bis(trimethoxysilyl)methane, bis(triethoxysilyl)methane, 1,2-bis(trimethoxysilyl)ethane and 1,2-bis(triethoxysilyl)ethane are preferred.

In the present invention, it is preferred to use the above-mentioned first alkoxysilane as a raw material of the fluid, silica precursor (A).

Further, in the present invention, it is more preferred to use the above-mentioned first alkoxysilane and second alkoxysilane in combination as raw materials of the fluid, silica precursor (A). When the first and second alkoxysilanes are used in combination, it becomes possible to further improve the adhesion strength between a porous silica thin film (formed from the coating composition of the present invention) and a substrate on which the thin film is formed. The reason for this is considered as follows. For example, when a trifunctional first alkoxysilane and a second alkoxysilane are used in combination as raw materials of the fluid, silica precursor (A), it becomes possible to reduce the amount of alkyl groups (which have only a weak binding ability with respect to a substrate) present at the interface between a porous silica thin film (formed from the coating composition of the present invention) and a substrate on which the thin film is formed, as compared to the case where only a trifunctional alkoxysilane is used as a raw material of the fluid, silica precursor (A). Thus, when the above-mentioned first and second alkoxysilanes are used in combination as raw materials of the fluid, silica precursor (A), it becomes possible to further improve the adhesion strength between the porous silica thin film and the substrate.

When the first alkoxysilane and the second alkoxysilane are used in a combination, the amount of the second alkoxysilane is preferably from 5 to 500 parts by weight, more preferably from 10 to 400 parts by weight, still more preferably from 20 to 300 parts by weight, relative to 100 parts by weight of the first alkoxysilane. When the amount of the second alkoxysilane is less than 5 parts by weight, the above-mentioned effect (i.e., further improvement of the adhesion strength between the thin film and the substrate) cannot be obtained.

For improving the smoothness and moisture resistance of the porous silica thin film obtained from the coating composition of the present invention, it is preferred to use an alkoxysilane which has a structure represented by formula (1) above but has three $R^1$ groups (i.e., n=3) (such an alkoxysilane is hereinafter referred to as a "monofunctional alkoxysilane") in combination with the first alkoxysilane and/or the second alkoxysilane.

Specific examples of the above-mentioned monofunctional alkoxysilanes include trimethylmethoxysilane, trimethylethoxysilane, triphenylmethoxysilane, triphenylethoxysilane, phenyldimethylmethoxysilane, phenyldimethylethoxysilane, diphenylmethylmethoxysilane and diphenylmethylethoxysilane.

In the present invention, when the above-mentioned monofunctional alkoxysilane is used, the amount thereof is 0.2 mole or less, per mole of the total of the alkoxysilanes. When the amount of the monofunctional alkoxysilane exceeds 0.2 mol, there is a danger that the adhesion strength between the substrate and the porous silica thin film obtained from the coating composition of the present invention is lowered, or that a porous silica thin film having a low refractive index cannot be obtained.

Further, in the present invention, for improving the strength of the porous silica thin film per se, which is obtained from the coating composition of the present invention, it is preferred to add a metal alkoxide other than silicon alkoxides (e.g., an alkoxide of aluminum, titanium or zirconium) to the coating composition, so long as the refractive index of the porous silica thin film would not become disadvantageously high. Specific examples of metal alkoxides other than silicon alkoxides include trimethoxyaluminum, triethoxyaluminum, tripropoxyaluminum, tributoxyaluminum, tetramethoxytitanium, tetraethoxytitanium, tetrapropoxytitanium, tetrabutoxytitanium, tetrapropyl zirconate and tetrabutyl zirconate.

In the present invention, when the above-mentioned metal alkoxide is used, the amount thereof is 0.2 mole or less, per mole of the Si atoms present in the coating composition. When the amount of the metal alkoxide exceeds 0.2 mole, there is a danger that the light transmittance of the porous silica thin film becomes disadvantageously low, and/or the refractive index of the porous silica thin film becomes disadvantageously high.

In the present invention, the fluid, silica precursor (A) is obtained by subjecting at least one alkoxysilane selected from the group consisting of the above-mentioned first alkoxysilane and the above-mentioned second alkoxysilane to hydrolysis and polycondensation in the presence of an acid catalyst. The fluid, silica precursor (A) is a chain silica polymer. In the present invention, the "chain silica polymer" also encompasses a silica polymer having a ladder structure or a branched structure as well as a silica polymer having a linear chain structure. Examples of silica polymers having a linear chain structure include polycondensation products which have a structure represented by formula (5.3) and a structure represented by formula (5.7) which are, respectively, described at pages 58 and 59 of "Zoru-geru hou no kagaku (Science of sol-gel process)" (written by Sumio Sakka, Agne Shofu Publishing Inc., Japan, 1988). Examples of silica polymers having a ladder structure include a polycondensation product having a structure represented by formula (61) described at page 210 of "Sol-gel science: the physics and chemistry of sol-gel processing" (written by C. J. Brinker and G. W. Scherer, Academic Press, U.S.A., 1990).

The weight average molecular weight of the fluid, silica precursor (A) is generally from 1,500 to 200,000, preferably from 2,000 to 100,000, more preferably from 2,500 to 50,000, still more preferably from 5,000 to 50,000. When the weight average molecular weight of the fluid, silica precursor (A) is less than 1,500, it becomes difficult to obtain a porous silica thin film having desired properties (i.e., a low refractive index, a high light transmittance and a high strength). On the other hand, when the weight average molecular weight is more than 200,000, the fluid, silica precursor (A) is likely to contain insoluble compounds (i.e., particles of the below-described silica) which causes the lowering of the light transmittance of a porous silica thin film obtained from the coating composition. The weight average molecular weight of the fluid, silica precursor (A) is measured by gel permeation chromatography (GPC) using a calibration curve obtained with respect to standard monodisperse polyethylene glycol samples.

When the fluid, silica precursor (A) is cured, silica is formed. In the present invention, the term "silica" means a solid silica having a strong, three-dimensional network of siloxane linkages, which is formed by condensation reaction of silanol groups present in the fluid, silica precursor (A). By the strong, three-dimensional network of siloxane bonds, the silica is firmly solidified so that it does not have fluidity. With respect to such silica, it is impossible to measure the molecular weight thereof.

As mentioned above, the coating composition of the present invention comprises a fluid, silica precursor (A), a basic compound (B) and an organic compound (C). The organic compound (C) is compatible with the fluid, silica precursor (A). Therefore, when the coating composition of the present invention is applied to a substrate to form an uncured thin film, the organic compound (C) is uniformly dispersed in the fluid, silica precursor (A) present in the uncured thin film. Further, the basic compound (B) is capable of promoting the condensation of silica, so that, by curing the above-mentioned uncured thin film, a cured thin film composed of the above-mentioned silica is obtained. Furthermore, in the above-mentioned cured thin film, the organic compound (C) functions as a pore-forming agent. Specifically, by extracting the organic compound (C) from the cured thin film with a solvent, it becomes possible to form a number of pores in the cured thin film, wherein the sizes of the pores are relatively uniform and are satisfactorily smaller than the wavelength of the visible light. By virtue of these features, the coating composition of the present invention can be used to form a porous silica thin film having a low refractive index, a high light transparency and a high strength. With respect to the above-mentioned components (B) and (C), detailed explanation is omitted here and will be made below after the explanation of component (A).

With respect to the acid catalyst used in the above-mentioned hydrolysis and polycondensation of an alkoxysilane, there is no particular limitation, and any type of acids can be used. Specific examples of acid catalysts include hydrochloric acid, nitric acid, phosphoric acid, acetic acid, oxalic acid, phthalic acid, benzoic acid, p-toluenesulfonic acid and a cation exchange resin.

Examples of cation exchange resins include strong acid type cation exchange resins, such as a cation exchange resin having sulfonyl groups as cation exchange groups; and weak acid type cation exchange resins, such as a cation exchange resin having carboxyl groups as cation exchange groups. With respect to these cation exchange resins, the cation exchange groups thereof are used in proton form.

In the present invention, the amount of the acid catalyst used is preferably from 0.000001 to 0.1 mol, more preferably from 0.00001 to 0.01 mol, per mol of Si atoms contained in the above-mentioned alkoxysilane. (When a cation exchange resin is used as the acid catalyst, the molar amount of the acid catalyst is expressed in terms of the molar amount of the cation exchange groups present in the cation exchange resin.) When the amount of the acid catalyst is less than 0.000001 mol, the formation of the chain silica polymer may not advance satisfactorily. On the other hand, when the amount of the acid catalyst is more than 0.1 mol, the viscosity of the reaction mixture containing the fluid, silica precursor (A) becomes disadvantageously high, which reaction mixture is obtained by adding water to the above-mentioned alkoxysilane and, then, performing hydrolysis and polycondensation of the alkoxysilane.

With respect to the method for producing the fluid, silica precursor (A) by subjecting the above-mentioned alkoxysilane to hydrolysis and polycondensation in the presence of an acid catalyst, an explanation is made below.

In the hydrolysis and polycondensation of the alkoxysilane, it is necessary to add water to the alkoxysilane. With respect to the addition of water to the alkoxysilane, generally, water is used alone or in the form of an aqueous solution containing at least one solvent (D) (described below). Water may be added in the form of a vapor. Depending on the type of the alkoxysilane, there is a danger that the hydrolysis and polycondensation of the alkoxysilane proceed too fast, thereby causing precipitation of the polycondensation product. Therefore, it is preferred to perform the addition of water by a method in which water is gradually added over a long period of time; a method in which the addition of water is performed in the presence of a solvent (e.g., an alcohol); or a method in which the addition of water is performed at low temperatures. These methods may be employed individually or in combination.

In the present invention, the amount of water added to the alkoxysilane is generally from 1 to 100 mol, preferably from 1 to 10 mol, per mol of the alkoxy groups contained in the alkoxysilane. When the amount of water is more than 100 mol, there is a danger that the formation rate of the fluid, silica precursor (A) is lowered.

When the cation exchange catalyst is used as an acid catalyst, the cation exchange catalyst is removed from the fluid, silica precursor (A) after the production thereof, by any conventional method, such as filtration.

When the fluid, silica precursor (A) is produced from a plurality of different alkoxysilanes, the different alkoxysilanes in the form of a mixture thereof may be subjected to hydrolysis and polycondensation in the presence of an acid catalyst. Alternatively, each of the alkoxysilanes may be individually subjected to hydrolysis and polycondensation in the presence of an acid catalyst, and, then, the resultant polycondensation products may be mixed together.

Next, the basic compound (B) is explained below.

The basic compound (B) has at least one member selected from the group consisting of a basic hydroxyl group and a basic nitrogen atom. The term "basic nitrogen atom" means a nitrogen atom present in a nitrogen-containing, basic functional group. The above-mentioned "basic nitrogen atom" does not encompass a nitrogen atom present in a basic compound represented by formula (3) which is shown below. The basic compound represented by formula (3) is a basic compound having a basic hydroxyl group.

In the present invention, the pH of a 0.1 N aqueous solution of the basic compound (B) is 11 or more. A 0.1 N aqueous solution of the basic compound (B) is an aqueous solution obtained by dissolving the basic compound (B) in water in an amount wherein the total molar amount of the basic hydroxyl groups and the basic nitrogen atoms, which are present in the aqueous solution, is 0.1 mol·dm$^{-3}$. The pH value of the above-mentioned aqueous solution can be measured by means of a conventional pH meter at about 20° C. When the pH of the aqueous solution is less than 11, the polycondensation degree of the silica (formed from the silica precursor (A)) becomes unsatisfactory, thereby causing disadvantages that the thin film formed from the coating composition is delaminated from the substrate, or that the refractive index of the thin film cannot be lowered. Further, when the pH of the aqueous solution is less than 11, there is also a danger that the viscosity of the coating composition is increased during the storage thereof, so that it becomes impossible to apply the coating composition to a substrate.

In the present invention, it is necessary that the vapor pressure of the basic compound (B) be 1.3 kPa or lower as measured at 100° C. The vapor pressure is preferably 0.8 kPa or lower, more preferably 0.4 kPa or lower. When the vapor pressure of the basic compound (B) is more than 1.3 kPa, it becomes impossible to obtain a porous silica thin film having a low refractive index. The reason for this is presumed that, when a basic compound having a vapor pressure of more than 1.3 kPa as measured at 100° C. is used, the basic compound is likely to volatilize during the curing of the thin film, so that it becomes impossible to obtain a cured thin film composed of silica having a satisfactorily high polycondensation degree.

With respect to each of a basic compound represented by formula (3):

$$R^5R^6R^7R^8NOH \quad (3)$$

wherein each of $R^5$, $R^6$, $R^7$ and $R^8$ independently represents a $C_1$–$C_{10}$ alkyl group which is bonded to a nitrogen atom, and a basic compound represented by formula (4):

$$M(OH)_x \quad (4)$$

wherein M represents an alkali metal or an alkaline earth metal, and x represents 1 or 2, the vapor pressure thereof is substantially zero. (Each of the above-mentioned basic compounds of formulae (3) and (4) exhibits a high ionicity in a solution thereof and, hence, is ionically dissociated in the solution, so that the vapor pressure of the basic compound is substantially zero.) Therefore, each of these basic compounds is regarded as a basic compound having a vapor pressure of "1.3 kPa or lower as measured at 100° C.".

In the present invention, the vapor pressure of a basic compound can be measured by the ebulliometry described at page 381 of "Dai Yonpan Jikken Kagaku Kouza 4, Netstu•atsuryoku (Lecture of chemical experiments 4, heat and pressure (4th edition)" (edited by The Chemical Society of Japan; published by Maruzen Co., Ltd., Japan, 1992). In the case of a basic compound which does not have a boiling point at 100° C. under a pressure of 0.1 kPa, such a compound is regarded as a basic compound having a vapor pressure of less than 0.1 kPa as measured at 100° C. Further, when aqueous ammonia is used as the basic compound (B), since ammonia is a volatile substance, the aqueous ammonia is regarded as a compound having a vapor pressure exceeding 1.3 kPa.

Preferred examples of basic compounds (B) include an inorganic base, a tetraalkylammonium hydroxide and an organic base.

Examples of inorganic bases include sodium hydroxide, potassium hydroxide and lithium hydroxide.

Examples of tetraalkylammonium hydroxides include tetramethylammonium hydroxide, tetraethylammonium hydroxide, tetrapropylammonium hydroxide, tetrabutylammonium hydroxide and 2-hydroxyethyltrimethylammonium hydroxide.

Examples of organic bases include a polyalkyleneimine having a weight average molecular weight of from 130 to 100,000, preferably from 130 to 50,000, more preferably from 130 to 10,000. Specific examples of polyalkyleneimines include dipropylene triamine, triethylene tetramine, tetraethylene pentamine and a linear or branched polyethyleneimine (obtained by polymerizing ethyleneimine) having a molecular weight of from 200 to 100,000, preferably from 200 to 50,000, more preferably from 200 to 10,000.

In the present invention, the amount of the basic compound (B) is from 0.0015 to 0.5 mol, preferably from 0.002 to 0.2 mol, more preferably from 0.005 to 0.08 mol, in terms of the total molar amount of the basic hydroxyl groups and basic nitrogen atoms in the basic compound (B), per mole of Si atoms present in the fluid, silica precursor (A). When the amount of the basic compound (B) is less than 0.0015 mol, there are dangers that the porous silica thin film is delaminated from the substrate during the extraction of the organic compound (C) therefrom which is performed to form pores in a thin film of the coating composition as described below in detail, or that a porous silica thin film having a low refractive index cannot be obtained. On the other hand, when the amount of the basic compound (B) is more than 0.5 mol, there is a danger that the light transmittance of the porous silica thin film is lowered.

When the amount of the acid catalyst remaining in the fluid, silica precursor (A) is as large as 0.1 mol or more, per mole of the Si atoms contained in the fluid, silica precursor (A), the basic compound (B) may be used in an amount exceeding the above-mentioned upper limit (i.e., 0.5 mol) for neutralizing the acid catalyst (in this case, the upper limit of the basic compound (B)=0.5 mol+equimolar amount to the remaining acid catalyst).

The total molar amount of the basic hydroxyl groups and basic nitrogen atoms present in the basic compound (B), per mole of the Si atoms contained in the fluid, silica precursor (A), can be calculated from the amount of the alkoxysilane used and the amount of the basic compound added.

Next, the organic compound (C) is explained below.

In the present invention, the boiling point of the organic compound (C) is 100° C. or more, preferably 150° C. or more, more preferably 250° C. or more. In the present invention, the boiling point of the organic compound (C) is a value as measured under atmospheric pressure. With respect to organic compounds which have substantially no boiling point, such compounds are regarded as organic compounds having a boiling point of 100° C. or more. For example, an organic polymer undergoes heat decomposition when the temperature thereof is elevated, so that an organic polymer has substantially no boiling point. Accordingly, such an organic polymer is regarded as an organic compound having a boiling point of 100° C. or more.

When the boiling point of the organic compound (C) is less than 100° C., even in the case where the organic compound (C) is used in a large amount, the organic compound (C) is likely to volatilize during the formation of an uncured thin film of the coating composition, thereby reducing the amount of the organic compound (C) in the thin film. As a result, it becomes impossible to form a satisfactorily large amount of pores in the thin film.

In the present invention, it is necessary that the organic compound (C) should be compatible with the fluid, silica precursor (A). The term "compatible" is used to mean that the organic compound (C) and the fluid, silica precursor (A) can be homogeneously mixed with each other at a molecular level. When the organic compound (C) is incompatible with the fluid, silica precursor (A), the light transmittance of the porous silica thin film obtained from the coating composition is lowered. The temperature at which the organic compound (C) is compatible with the fluid, silica precursor (A) is preferably in the range of from room temperature to the temperature at which the formation of the uncured thin film of the coating composition is performed. For example, compounds which are compatible with fluid, silica precursor (A) are those having a functional group or a bond, which is capable of forming a hydrogen bond with a silanol group of the fluid, silica precursor (A), thereby compatibilizing the compound (C) with the silica precursor (A).

Examples of organic compounds (C) include organic compounds having at least one polar group selected from the group consisting of an ether group, an ester group, a carbonyl group, a carboxyl group, a carbonate group, an amide group and a hydroxyl group. The above-mentioned "amide group" means a group represented by any of the following chemical formulae: —$CONH_2$, —CONH—, —CON<.

Specific examples of organic compounds (C) include a polyether, a polyester, a polycarbonate, a polyamide, a cellulose, a polyvinyl alcohol, a polyvinyl ether, a polyvinyl pyrrolidone, a polyacrylamide and a polyacrylic acid.

Preferred examples of the above-mentioned polyethers include aliphatic polyethers, each independently having $C_2$–$C_{12}$ ether recurring units.

Preferred examples of the above-mentioned polyesters include aliphatic polyesters, each independently having $C_2$–$C_{12}$ ester recurring units.

Preferred examples of the above-mentioned polycarbonates include aliphatic polycarbonates, each independently having $C_2$–$C_{12}$ carbonate recurring units.

Preferred examples of the above-mentioned polyamides include aliphatic polyamides, each independently having $C_2$–$C_{12}$ amide recurring units.

The above-mentioned polymers may be used individually or in combination. Further, each of the above-mentioned polymers may be a copolymer which contains, in its main chain, monomer units other than the above-mentioned recurring units, so long as the effects of the present invention are not impaired.

Examples of aliphatic polyethers include polyalkylene glycols (e.g., a polyethylene glycol, a polypropylene glycol, a polytrimethylene glycol, a polytetramethylene glycol, polypentamethylene glycol, polyhexamethylene glycol, polydioxolane, polydioxepane and the like) and copolymers thereof. Examples of copolymers of the above-mentioned polyalkylene glycols include a polyethylene glycol/polypropylene glycol block copolymer, a polyethylene glycol/polytetramethylene glycol block copolymer and a polyethylene glycol/polypropylene glycol/polyethylene glycol block copolymer.

Among these aliphatic polyethers, preferred are polyethylene glycol, polypropylene glycol, polyethylene glycol/polypropylene glycol block copolymer, polyethylene glycol/polytetramethylene glycol block copolymer and polyethylene glycol/polypropylene glycol/polyethylene glycol block copolymer.

More preferred examples of the above-mentioned aliphatic polyethers include aliphatic polyethers having $C_1$–$C_{12}$ alkoxy groups at all terminals thereof. Specific examples of such aliphatic polyethers include a polyethylene glycol, a polypropylene glycol, a polyethylene glycol/polypropylene glycol block copolymer, a polyethylene glycol/polytetramethylene glycol block copolymer and a polyethylene glycol/polypropylene glycol/polyethylene glycol block copolymer, each having at both terminals thereof ether groups (e.g., a methyl ether group, an ethyl ether group, a propyl ether group, a pentyl ether group, a hexyl ether group, a heptyl ether group and an octyl ether group). Most preferred examples of the above-mentioned aliphatic polyethers include a polyethylene glycol dimethyl ether.

When the above-mentioned aliphatic polyether having alkoxy groups at the terminals thereof is used as the organic compound (C), it becomes possible to reduce the amount of the residual compound (C) remaining in the porous silica thin film (which is, as described below in detail, formed by extracting the organic compound (C) from a cured thin film obtained by curing an uncured thin film of the coating composition of the present invention).

Examples of the above-mentioned aliphatic polyesters include a polycondensation product of a hydroxycarboxylic acid, such as a polyglycolide; a ring opening-polymerization product of a lactone, such as a polycaprolactone and a polypivalolactone; a polycondensation product of a dicarboxylic acid with an alkylene glycol, such as a polyethylene oxalate, a polyethylene succinate, a polyethylene adipate, a polyethylene sebacate, a polypropylene adipate and a polyoxydiethylene adipate; and a ring-opening copolymerization product of an epoxide with an acid anhydride. The above-mentioned alkylene glycol means a divalent alcohol obtained by replacing two hydrogen atoms of an alkane having at least two carbon atoms (which hydrogen atoms are, respectively, bonded to two different carbon atoms of the alkane) by hydroxyl groups. The above-mentioned dicarboxylic acid means an organic acid having two carboxyl groups, such as oxalic acid, malonic acid, succinic acid, glutaric acid, adipic acid, pimelic acid, suberic acid, azelaic acid and sebacic acid.

Examples of the above-mentioned aliphatic polycarbonates include a polyethylene carbonate, a polypropylene carbonate, a polypentamethylene carbonate and a polyhexamethylene carbonate.

Examples of the above-mentioned aliphatic polyamides include a polyoxazoline derivative, a polyimide derivative, a polyurethane derivative, a polyurea derivative, a nylon derivative and a mixture of these polyamides.

In the present invention, for adjusting the viscosity of the coating composition and improving the coating property of the coating composition, any appropriate polymers other than mentioned above may be added, so long as the effects of the present invention are not impaired.

The weight average molecular weight of each of the above-mentioned organic polymers which can be used as the organic compound (C) (i.e., a polyether, a polyester, a polycarbonate, a polyamide, a cellulose, a polyvinyl alcohol, a polyvinyl ether, a polyvinyl pyrrolidone, a polyacrylamide, a polyacrylic acid and the like) is generally in the range of from 200 to 100,000, preferably from 300 to 80,000, more preferably from 400 to 50,000. When the weight average molecular weight of the organic polymer is less than 200, such a low molecular weight polymer is likely to be separated from the other components of the coating composition during the application of the coating composition to a substrate or the curing of the resultant thin film formed on the substrate, so that it becomes impossible to form pores in the cured thin film. On the other hand, when the weight average molecular weight of the organic polymer is more than 100,000, the organic polymer is likely to remain in the cured thin film, so that it becomes impossible to obtain a porous silica thin film. The weight average molecular weight of the organic polymer is measured by gel permeation chromatography (GPC) using a calibration curve obtained with respect to monodisperse polyethylene glycol samples.

Further, as examples of organic compounds (C) which are more preferred than the above-mentioned organic polymers, from the viewpoint of efficiently extracting the organic compound (C) from the solvent, there can be mentioned a polyhydric alcohol or a saccharide, each of which has at least 3 hydroxyl groups, or an ester obtained by esterifying at least one of the hydroxyl groups of the above-mentioned polyhydric alcohol or saccharide. When any of these compounds is used as the organic compound (C), it is preferred that the organic compound (C) has an oxygen/carbon atomic ratio of 0.5 or more. Further, with respect to each of the above-mentioned polyhydric alcohol, saccharide and ester, the weight average molecular weight thereof is preferably 1,000 or less. Furthermore, the above-mentioned polyhydric alcohol, saccharide and ester may be used in combination. The above-mentioned oxygen/carbon atomic ratio can be calculated from the molecular formula of the compound. When a mixture of any of the above-mentioned polyhydric alcohol, saccharide and ester is used as the organic compound (C), the oxygen/carbon atomic ratio thereof is defined as the ratio of the total molar amount of oxygen atoms contained in the mixture to the total molar amount of carbon atoms contained in the mixture.

Examples of the above-mentioned polyhydric alcohols include glycerine; pentaerythritol; dipentaerythritol; trimethylolpropane; ditrimethylolpropane; sugar alcohols, such as xylitol, mannitol and sorbitol; and cyclic sugar alcohols, such as inositol.

Examples of the above-mentioned saccharides include monosaccharides having a cyclic structure, such as glucose, fluctose, galactose and mannose; and disaccharides which have two rings bonded through a glycoside linkage, such as maltose, sucrose, lactose and cellobiose.

Preferred examples of esters of the above-mentioned polyhydric alcohols and saccharides include those which are formed by replacing the hydrogen atom(s) of the hydroxyl group(s) of the polyhydric alcohols or the saccharides by an acetyl group(s).

Among the above-mentioned polyhydric alcohols, saccharides and esters thereof, preferred are glyceryl triacetate and sucrose octacetate.

In the present invention, the amount of the organic compound (C) is generally from 0.1 to 10 parts by weight, preferably 0.5 to 5 parts by weight, most preferably from 0.5 to 3 parts by weight, per part by weight of silica which would be obtained from the alkoxysilane used in the production of the fluid, silica precursor (A) on the assumption that the whole amount of the alkoxysilane is converted to silica by hydrolysis and polycondensation (hereinafter, the above-mentioned amount of the organic compound (C) per part by weight of silica is frequently referred to as "organic compound (C)/silica weight ratio").

When the above-mentioned organic compound (C)/silica weight ratio is less than 0.1 part by weight, there is a danger that it becomes impossible to form a porous silica thin film having a refractive index which is sufficiently low for practical use. On the other hand, when the weight ratio is more than 10 parts by weight, there is a danger that the cured thin film gets delaminated from the substrate during the extraction of the organic compound (C) from the thin film.

As mentioned above, the coating composition of the present invention contains a fluid, silica precursor (A), a basic compound (B) and an organic compound (C) as essential components. Hereinbelow, explanations are made with respect to preferred additional components of the coating composition of the present invention.

In the present invention, for improving the efficiency in applying the coating composition to the substrate (i.e., the efficiency in forming a film using the coating composition), it is preferred that the coating composition further comprises a solvent (D) (i.e., solvent for improving coating efficiency). Further, for suppressing the increase in the viscosity of the coating composition, it is preferred that the coating composition further comprises a tetraalkylammonium salt (E).

With respect to the above-mentioned solvent (D), specific explanation is made below.

The solvent (D) is a solvent for a mixture of the fluid, silica precursor (A), the basic compound (B) and the organic compound (C). In the present invention, when the solvent (D) is used, it becomes necessary to remove the solvent (D) from the coating composition after the application thereof to a substrate (i.e., it becomes necessary to volatilize the solvent (D) from the thin film of the coating composition, which is formed on the substrate). Therefore, it is preferred that the solvent (D) contains a volatile solvent. Further, it is preferred that the solvent (D) is a solvent which would not markedly dissolve the substrate.

By adding the solvent (D) to the coating composition of the present invention, the weight ratio of the silica precursor (A) to the coating composition can be appropriately adjusted. The solvent (D) is preferably used in an amount wherein the amount of the silica precursor (A) falls within the range of from 0.01 to 10% by weight, more preferably from 0.05 to 5% by weight, based on the weight of the coating composition. When the amount of the fluid, silica precursor (A) becomes less than 0.01% by weight, there is a tendency that a thin film having a satisfactory thickness cannot be obtained. On the other hand, when the amount of the fluid, silica precursor (A) exceeds 10% by weight, the coating composition becomes too viscose, thereby lowering the efficiency in the coating operation using the coating composition.

Examples of solvents (D) include water; alcohols, such as monohydric $C_1$–$C_6$ alcohols, dihydric $C_1$–$C_6$ alcohols and glycerine; amides, such as formamide, N-methylformamide, N-ethylformamide, N,N-dimethylformamide, N,N-diethylformamide, N-methylacetamide, N-ethylacetamide, N,N-dimethylacetamide, N,N-diethylacetamide and N-methylpyrrolidone; ethers, such as tetrahydrofuran, diethyl ether, di(n-propyl) ether, diisopropyl ether, diglyme, 1,4-dioxane, ethylene glycol monomethyl ether, ethylene glycol monoethyl ether, ethylene glycol dimethyl ether, ethylene glycol diethyl ether, propylene glycol monomethyl ether, propylene glycol monoethyl ether and propylene glycol dimethyl ether; esters, such as ethyl formate, methyl acetate, ethyl acetate, ethyl lactate, ethylene glycol monomethyl ether acetate, ethylene glycol diacetate, propylene glycol monomethyl ether acetate, diethyl carbonate, ethylene carbonate and propylene carbonate; ketones, such as acetone, methyl ethyl ketone, methyl propyl ketone, methyl (n-butyl) ketone, methyl isobutyl ketone, methyl amyl ketone, cyclopentanone and cyclohexanone; nitriles, such as acetonitrile, propionitrile, n-butyronitrile and isobutyronitrile; dimethyl sulfoxide; dimethyl sulfone; and sulfolane. These solvents may be used individually or in combination. Further, the solvent may be mixed with another appropriate solvent or an additive.

Preferred examples of solvents (D) include mixtures of monovalent $C_1$–$C_6$ alcohols or alkanol ethers (e.g., ethylene glycol monomethyl ether, ethylene glycol monoethyl ether, propylene glycol monomethyl ether and propylene glycol monoethyl ether) with water, methyl ethyl ketone or methyl isobutyl ketone.

In the present invention, from the viewpoint of forming a porous silica thin film having a smooth surface on a substrate, it is preferred that the solvent (D) comprises a high boiling-point solvent having a hydroxyl group and having a boiling point of 100° C. or higher, in an amount of 5% by weight or more, based on the weight of the coating composition. The amount of the above-mentioned high boiling-point solvent is more preferably from 5 to 99.99% by weight, still more preferably from 5 to 99.95% by weight, most preferably from 5 to 99.7% by weight, based on the weight of the coating composition.

Examples of high boiling-point solvents having a hydroxyl group and having a boiling point of 100° C. or higher include water, ethylene glycol monomethyl ether, ethylene glycol monoethyl ether, propylene glycol monomethyl ether and propylene glycol monoethyl ether.

With respect to the above-mentioned tetraalkylammonium salt (E), specific explanation is made below.

When the porous silica thin film obtained from the coating composition of the present invention is used as an antireflection film, the fluctuation of the thickness of the thin film causes the change in the color of the reflected lights, so that the color of the thin film becomes non-uniform. Therefore, it is preferred that, when the coating composition of the present invention is allowed to stand, or when the coating composition is stirred, the increase in the viscosity of the coating composition is small. For suppressing the increase in the viscosity of the coating composition, a tetraalkylammonium salt (E) can be used. In the present invention, when the tetraalkylammonium salt (E) is used, it is preferred that the tetraalkylammonium salt is used in combination with a solvent (D) which is capable of dissolving therein the tetraalkylammonium salt (E).

With respect to the tetraalkylammonium salt, there is no particular limitation. Preferred examples of tetraalkylammonium salts (E) include those represented by the following formula (5):

$$R^9R^{10}R^{11}R^{12}NX \qquad (5)$$

wherein each of $R^9$, $R^{10}$, $R^{11}$ and $R^{12}$ independently represents a $C_1$–$C_{10}$ alkyl group bonded to the nitrogen atom, and X represents a halogen atom.

Specific examples of tetraalkylammonium salts (E) include tetraethylammonium chloride, tetraethylammonium bromide, tetrapropylammonium chloride, tetrapropylammonium bromide, tetrabutylammonium chloride, tetrabutylammonium bromide, tetraoctylammonium chloride and tetraoctylammonium bromide.

The amount of the tetraalkylammonium salt (E) is preferably from 1 to 50 parts by weight, relative to 100 parts by weight of the fluid, silica precursor (A). When the amount of the tetraalkylammonium salt (E) is less than 1 part by weight, it becomes difficult to suppress the increase in the viscosity of the coating composition. On the other hand, when the amount of the tetraalkylammonium salt is more than 50 parts by weight, there is a danger that a part of the tetraalkylammonium salt (E) remains in the porous silica thin film, thereby lowering the durability of the thin film.

In the present invention, when the fluid, silica precursor (A) has a (meth)acryloyl group-containing organic group, it is preferred that the coating composition contains an azo-type or peroxide-type radical initiator, or a photoradical initiator, such as acetophenone, benzophenone, a ketal or anthraquinone.

Further, in the present invention, when the fluid, silica precursor (A) has an epoxy group-containing organic group, the basic compound (B) functions as a polymerization initiator. In such a case, from the viewpoint of the storage stability of the coating composition, it is preferred that the basic compound (B) is added to other components of the coating composition just before the application of the coating composition to a substrate. When the basic compound (B) is added to other components of the coating composition just before the application of the coating composition to a substrate, it is preferred that the application of the coating composition is performed by means of a coating apparatus which is capable of performing a coating operation while mixing together two or more different solutions.

Hereinbelow, the method for producing the coating composition of the present invention is described.

In the method for producing the coating composition of the present invention, there is no particular limitation with respect to the order of mixing the components (i.e., the fluid, silica precursor (A), the basic compound (B) and the organic compound (C)). However, it is preferred that the fluid, silica precursor (A) and the organic compound (C) are mixed together first, and then the basic compound (B) is added thereto.

When the mixing of the components is performed in the above-mentioned order, it is preferred that the fluid, silica precursor (A) and the organic compound (C) are added to the solvent (D), followed by addition of a mixture of the basic compound (B) and the solvent (D).

In the present invention, as mentioned above, the fluid, silica precursor (A) can be obtained by adding water to the above-mentioned alkoxysilane, and subjecting the resultant mixture to hydrolysis and polycondensation. The resultant reaction mixture per se can be used as a fluid, silica precursor (A). Alternatively, the reaction mixture can be condensed by a conventional method, and the resultant condensate of the reaction mixture can be used as a fluid, silica precursor (A). Further, the fluid silica precursor (A) may be isolated from the above-mentioned reaction mixture by a conventional method. When the above-mentioned condensation of the reaction mixture is performed, the organic compound (C) and/or the solvent (D) may be mixed with the above-mentioned reaction mixture containing the fluid, silica precursor (A) prior to the condensation.

Further, when the organic compound (C) has a poor compatibility with the fluid, silica precursor (A), it is preferred that the organic compound (C) is added to the alkoxysilane prior to or during the hydrolysis and polycondensation of the alkoxysilane. By adding the organic compound (C) in the above-mentioned manner, it becomes possible to improve the compatibility of the organic compound (C) with the fluid, silica precursor (A).

For uniformly mixing the components of the coating composition, it is preferred that the mixture containing the fluid, silica precursor(A), the basic compound (B) and the organic compound (C) is stirred by a conventional method at room temperature to 50° C. With respect to the stirring time, there is no particular limitation; however, it is preferred that the stirring time is in the range of from 5 minutes to 24 hours, more advantageously from 5 minutes to 5 hours, still more advantageously from 5 minutes to 2 hours.

The porous silica thin film obtained from the coating composition of the present invention can be advantageously used as an antireflection film which are used to coat an optical part, a lens (e.g., lenses of glasses), a display screen and the like.

Hereinbelow, the method for producing the porous silica thin film is described.

The porous silica thin film of the present invention is produced by a method comprising the steps of:

(1) applying the coating composition of the present invention to a substrate to form a thin film of the composition on the substrate, the thin film comprising the fluid, silica precursor (A) having dispersed therein the basic compound (B) and the organic compound (C), (2) curing the thin film to obtain a cured thin film in which the fluid, silica precursor (A) has been converted to silica, and (3) subjecting the cured thin film to an extraction with a solvent to remove the organic compound (C) from the cured thin film, thereby obtaining a porous silica thin film.

With respect to the substrate used in the present invention, there is no particular limitation. For example, a glass sheet, a plastic sheet or a transparent film can be used as the substrate. It is preferred that the substrate is a transparent sheet or film. Specific examples of transparent sheets and films include cellulose acetate-type films, such as a triacetyl cellulose film and a cellulose acetate propionate film; stretched polyester films or sheets, such as stretched films or sheets of polyethylene terephthalate and polyethylene naphthalate; polycarbonate films or sheets; acrylic films or sheets; norbornene films or sheets; polyarylate films or sheets; and polysulfone films or sheets. Among these, especially preferred are a cellulose triacetate film, a cellulose acetate propionate film, a polycarbonate film, a stretched polyethylene terephthalate film, an acrylic sheet and a polycarbonate sheet.

With respect to the shape of the substrate, there is no particular limitation. When the coating composition is applied to the substrate by spin-coating, it is preferred to use a circular substrate. On the other hand, when the coating composition is applied to a substrate by a method other than the spin-coating, it is preferred to use a rectangular substrate. Further, when the coating composition is applied to the substrate in a continuous manner, it is preferred to use a substrate in the form of a rolled film.

In step (1) above, the coating composition may be applied to the substrate by means of a conventional coater, such as a dip coater, a spin coater, a knife coater, a bar coater, a blade coater, a squeeze coater, a reverse-roll coater, an gravure-roll coater, a slide coater, a curtain coater, a spray coater, a dye coater and a cap coater. Among these coaters, preferred are those which are capable of performing a continuous coating. Specifically, the above-mentioned coaters exclusive of the dip coater and the spin coater are capable of performing a continuous coating.

The coating temperature is preferably in the range of from room temperature to 80° C., more preferably from room temperature to 60° C., still more preferably from room temperature to 50° C. However, for suppressing the evaporation rate of the solvent (D), the coating may be performed at temperatures lower than room temperature.

The coating may be performed at any time after the addition of the basic compound (B) to other components of the coating composition; however, it is preferred that the coating is performed within 24 hours, more advantageously within 10 hours, still more advantageously within 5 hours, after the addition of the basic compound (B).

Further, in step (1) above, it is preferred that the coating composition is filtered prior to application thereof to a substrate by a conventional method, so as to remove insoluble silica components, impurities and the like.

In the present invention, it is preferred that, in step (1) above, the coating composition is applied to the substrate at a temperature lower than the heat distortion temperature of the substrate, and that, in step (2) above, the fluid, silica precursor (A) in the thin film is cured (i.e, the fluid, silica precursor (A) is converted to silica) at a temperature lower than the heat distortion temperature of the substrate, to thereby form a silica/organic compound hybrid thin film. The heat distortion temperature of the substrate varies depends on the type of substrate. For example, the heat distortion temperatures of a cellulose triacetate film, a cellulose acetate propionate film and an acrylic sheet are in the range of from 60 to 100° C., and the heat distortion temperatures of a polycarbonate film, a stretched polyethylene terephthalate film and a polycarbonate sheet is in the range of from 100 to 140° C.

In step (2) above, the temperature at which the thin film is cured can be appropriately selected depending on the heat distortion temperature of the substrate. For example, when the substrate is an optical film, the curing of the thin film is performed at a temperature in the range of from 60 to 150° C., preferably from 70 to 130° C., more preferably from 80 to 120° C. When the temperature is lower than 60° C., it becomes impossible to obtain a porous thin film having excellent adhesion property. On the other hand, when the temperature is higher than 150° C., there is a danger that the substrate suffers heat distortion.

The porous silica thin film of the present invention is advantageous not only in that it has a low refractive index, a high light transparency and a high strength, but also in that it can be obtained with high productivity even when the curing time is short. The curing time is generally within 1 hour, preferably within 10 minutes, more preferably within 2 minutes. When the curing time becomes longer than 1 hour, the productivity of the thin film is lowered.

In step (3) above, the extraction is performed by contacting the cured thin film formed on the substrate with an extraction solvent. With respect to the method for contacting the cured thin film with the extraction solvent, there can be mentioned a method in which the substrate is immersed in the extraction solvent; and a method in which the surface of the cured thin film is washed with the extraction solvent. With respect to the extraction solvent, there is no particular limitation so long as the solvent is capable of dissolving therein the organic compound (C), and it is possible to use the above-mentioned solvent (D) (i.e., solvent for improving coating efficiency) as the extraction solvent. For example, when the organic compound (C) has at least one polar group selected from the group consisting of an ether group, an ester group, a carbonyl group, a carboxyl group, a carbonate group, an amide group and a hydroxyl group, it is preferred to use a polar solvent as the extraction solvent, which polar solvent has at least one polar group selected from the group consisting of an ether group, an ester group, a carbonyl group, a carboxyl group, a carbonate group, an amide group and a hydroxyl group. Examples of such polar solvents include water, a $C_1$–$C_6$ monohydric alcohol and acetone. More preferred examples of such polar solvents include water, ethanol, propanol, isopropanol, a mixed solvent of water and ethanol, a mixed solvent of water and isopropanol, and a mixed solvent of water and acetone.

For improving the efficiency of the removal of the basic compound (B), an acid may be added to the extraction solvent in a small amount. With respect to the acid, there is no particular limitation; however, it is preferred to use an acid which has high volatility, such as hydrochloric acid, and acetic acid.

In step (3) above, the extraction temperature is not particularly limited so long as the substrate does not suffer heat distortion. The extraction temperature is preferably not higher than 100° C., more preferably not higher than 60° C., still more preferably not more than 40° C.

Further, in step (3) above, the organic compound (C) can be removed from the cured thin film even when the extraction time is short. The extraction time is preferably within 30 minutes, more preferably within 10 minutes, still more preferably within 1 minute, most preferably within 20 seconds. In the present invention, the extraction completes immediately after the contact of the cured thin film with the extraction solvent, so that, when the extraction is performed for longer than 30 minutes, the productivity of the thin film is lowered.

After the extraction, the obtained porous silica thin film is dried. With respect to the drying of the thin film, as in the case of the curing temperature, the drying temperature can be appropriately selected depending on the heat distortion temperature of the substrate. However, the drying temperature is generally from 60 to 150° C., preferably from 70 to 130° C., more preferably from 80 to 120° C. The drying the porous silica thin film is effective not only for improving the strength of the thin film, but also for removing the extraction solvent from the thin film. Therefore, it is preferred that the porous silica thin film is dried at the uppermost temperature at which the substrate does not suffer heat distortion.

When a porous silica thin film is obtained by a conventional method in which the thin film is formed using only an acid catalyst, the condensation of the silanol groups during the curing of the thin film would not advance to a satisfactory level (i.e., the polycondensation degree of silica is low), so that the thin film is likely to be delaminated from the substrate during the extraction. In this case, even when the thin film does not get delaminated from the substrate during the extraction, the thin film after the drying thereof is likely to have a low porosity, so that a thin film having a low refractive index cannot be obtained.

With respect to the drying of the thin film, the drying time varies depending on the drying temperature; however, the drying time is generally within 1 hour, preferably within 10 minutes, more preferably within 2 minutes. When the drying time becomes longer than 1 hour, the productivity of the thin film is lowered.

With respect to the method for drying the thin film, there is no particular limitation, and any conventional method can be used. However, it is preferred to employ a method in which the drying can be performed under atmospheric pressure so that a large-scale drying apparatus is not necessary. Preferred examples of drying methods include a hot-air circulation drying and a heat radiation drying. Further examples of drying methods include an infrared drying and a dielectric heating.

In the present invention, the porous silica thin film obtained by the above-mentioned method may be irradiated with an electron beam or ultraviolet rays, so as to improve the strength of the thin film. Further, when a fluid, silica precursor (A) having a (meth)acrylate group is used, it is preferred that the irradiation with an electron beam or ultraviolet rays is performed at a certain point in time during the production of the porous silica thin film. For example, the irradiation with an electron beam or ultraviolet rays may be performed before the curing of the thin film, during the curing of the thin film and/or after the curing of the thin film. The irradiation may be performed in an atmosphere of an inert gas, such as nitrogen.

In the present invention, with respect to the thickness of the porous silica thin film, there is no particular limitation. For example, when the porous silica thin film is used as a single-layer antireflection film, it is preferred that the thickness of the porous silica thin film is in the range of from 50 to 1,000 nm. When the thickness of the porous silica thin film becomes less than 50 nm, there is a danger that the antireflection effect of the thin film is lowered. On the other hand, when the thickness of the porous silica thin film becomes more than 1,000 nm, the phase shift of visible rays is disordered, thus lowering the antireflection effect which is obtained by the interference of the visible rays. When the porous silica thin film is used as a single-layer antireflection film, the thickness of the porous silica thin film is more preferably from 50 to 500 nm, still more preferably from 60 to 200 nm.

The porous silica thin film having a low refractive index which is obtained from the coating composition of the present invention can be advantageously used in various application fields, such as glasses (e.g., lenses of glasses, lenses of goggles and contact lenses); automobiles (e.g., windows of an automobile, instrumental panels and a navigation system); housing and building (e.g., windowpane); agriculture (e.g., a light transmitting film or sheet for a greenhouse); energy-supplying means (e.g., solar battery, light battery and laser); electronic information appliances (e.g., a cathode-ray tube, a notebook computer, an electronic organizer, a touch screen, a liquid crystal television, a projection television, an optical fiber and an optical disc); household articles (e.g., a lighting globe, a fluorescent light, a mirror and a clock); business articles (e.g., a showcase, a picture frame, semiconductor lithography and a copying machine); and amusement articles (e.g., a liquid crystal display game machine, a glass lid of a pinball machine, and game machines). Specifically, the porous silica thin film can be advantageously used as a coating for a light-transmitting optical substrate, which coating is capable of preventing glaring and/or improving the light transmittance.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, an optical film and a silicon wafer having a diameter of 3 inches were used as substrates. As an optical film, a biaxially oriented polyethylene terephthalate (PET) film (trade name: COSMOSHINE A4300; manufactured and sold by Toyobo Co., Ltd., Japan) (thickness of the film: 188 μm) was used.

In the following Examples and Comparative Examples, various measurements and analyses were performed by the following methods.

(1) Weight Average Molecular Weight of Fluid, Silica Precursor

A silica precursor was dissolved in tetrahydrofuran to obtain a solution, and the obtained solution was analyzed by gel permeation chromatography (GPC). Specifically, the weight average molecular weight of the silica precursor was determined using a calibration curve obtained with respect to monodisperse polyethylene glycol samples. The GPC analysis was performed under the following conditions:

Apparatus: Shimadzu GPC system 10A series (manufactured and sold by Shimadzu Corporation, Japan);

Columns: SHODEX KF-804L (manufactured and sold by Showa Denko K.K., Japan) (the columns were connected in series);

Measurement temperature: 40° C.;

Mobile phase: tetrahydrofuran (flow rate: 1.0 ml/min); and

Detector: differential refractometer.

(2) pH of Aqueous Solution of Basic Compound

The pH value of an aqueous solution of a basic compound was measured by means of a pH meter (trade name: D-12; manufactured and sold by Horiba Ltd., Japan).

(3) Vapor Pressure of Basic Compound

The vapor pressure of a basic compound was measured by the ebulliometry described at page 381 of "Dai Yonpan Jikken Kagaku Kouza 4, Netstu•atsuryoku (Lecture of chemical experiments 4, heat and pressure (4th edition)" (edited by The Chemical Society of Japan; published by Maruzen Co., Ltd., Japan, 1992). In the case of a basic compound having no a boiling point at 100° C. under a pressure of 0.1 kPa, such a compound was regarded as a basic compound having a vapor pressure of less than 0.1 kPa as measured at 100° C. Further, in the case where aqueous ammonia was used as the basic compound, since ammonia is a volatile substance, the aqueous ammonia was regarded as a compound having a vapor pressure exceeding 1.3 kPa.

(4) Molar Ratio of Basic Hydroxyl Groups and Basic Nitrogen Atoms Present in a Basic Compound to the Si Atoms Present in a Fluid, Silica Precursor (Hereinafter, Frequently Referred to as "Basic Compound/Si Molar Ratio)

The molar amount of basic hydroxyl groups and basic nitrogen atoms present in a basic compound, per mole of Si atoms present in the fluid, silica precursor, was calculated from the amount of the alkoxysilane used and the amount of the basic compound used.

(5) Appearance of Coating Composition

The appearance of a coating composition was evaluated by visual observation in accordance with the following criteria:

Good: no clouding or precipitation is observed in the coating composition.

Precipitation: a precipitation is observed in the coating composition.

(6) Viscosity of Coating Composition

The viscosity of a coating composition was measured by means of a viscometer (trade name: RE550L; manufactured and sold by Toki Sangyo Co., Ltd., Japan) at 25° C.

(7) Light Transmittance and Reflectance at Incidence Angle of 12° (Absolute Reflectance)

The light transmittance and the reflectance at an incidence angle of 12° (absolute reflectance) were measured with respect to a thin film formed on the above-mentioned PET film by means of a spectrophotometer (trade name: MPC-2200; manufactured and sold by Shimadzu Corporation, Japan).

(8) Refractive Index and Void Ratio

The refractive index (with respect to a ray having an energy of 1.95 eV) and the void ratio were measured with respect to a thin film formed on the above-mentioned silicon wafer by means of an ellipsometer (manufactured and sold by Jobin Yvon, France).

(9) Haze

The haze of a porous silica thin film was measured by means of a turbidimeter (trade name: NDH2000; manufactured and sold by Nippon Denshoku Industries Co., Ltd., Japan).

(10) Pencil Hardness

The pencil hardness of a thin film formed on the above-mentioned PET film was measured in accordance with JIS K5400 under a load of 1 kg.

(11) Appearance of Thin Film

The appearance of a thin film formed on the above-mentioned PET film was evaluated by visual observation in accordance with the following criteria:

Good: the thin film is uniformly formed on the PET film, and no light scattering is observed.

Partially delaminated: the thin film is partially delaminated from the PET film.

Light scattering observed: a light scattering by the thin film is observed.

Further, in the following Examples and Comparative Examples, spin-coating of a coating composition was performed by means of a spin coater (trade name: 1H-D2; manufactured and sold by MIKASA Co., Ltd., Japan). Specifically, the spin-coating was performed at room temperature, firstly at 500 rpm for 3 seconds, and then at 1000 rpm for 60 seconds.

Furthermore, drying of a thin film was performed by means of a forced convection oven (trade name: DKN-401; manufactured and sold by Yamato Scientific Co., Ltd., Japan).

EXAMPLE 1

14.8 g of methyltriethoxysilane (83.1 mmol) (the theoretical amount of silica which would be obtained from this amount of methyltriethoxysilane is 5.58 g on the assumption that the whole amount of methyltriethoxysilane is converted to silica by hydrolysis and polycondensation) and 4.3 g of tetraethoxysilane (20.7 mmol) (the theoretical amount of silica which would be obtained from this amount of tetraethoxysilane is 1.24 g on the assumption that the whole amount of tetraethoxysilane is converted to silica by hydrolysis and polycondensation) were mixed together to obtain a homogeneous mixture thereof. To the obtained mixture was gradually added a mixture of 7.0 g of water and 0.059 g of phosphoric acid (acid catalyst). Then, hydrolysis and polycondensation were performed at 50 ° C. for 5 hours, thereby obtaining a reaction mixture containing a fluid, silica precursor (A).

Subsequently, to the obtained reaction mixture were added 6.82 g of polyethylene glycol dimethyl ether (organic compound (C)) (weight average molecular weight: 600; substantially no boiling point) and 5.0 g of propylene glycol monomethyl ether while stirring. Then, the resultant mixture was condensed at room temperature, so as to remove water, ethanol and propylene glycol monomethyl ether therefrom until the amount of the mixture was reduced to about 15 g. The weight average molecular weight of the fluid, silica precursor (A) present in the resultant condensate was 31,400. To the condensate was added propylene glycol monomethyl ether, to thereby obtain 68.2 g of a condensate mixture containing the fluid, silica precursor (A). With respect to the obtained condensate mixture, the weight ratio of the theoretical amount of silica (which would be obtained by polycondensation of the silica precursor (A)) to the condensate mixture was 0.1, wherein the theoretical amount of silica was calculated on the assumption that the whole amount of the silica precursor (A) contained in the condensate mixture is converted to silica by polycondensation reaction. (Hereinafter, the above-mentioned condensate mixture is referred to as "high concentration silica precursor mixture".)

Separately from the above, in each of two containers, 2.5 g of water and 2.5 g of propylene glycol monomethyl ether were mixed together to obtain a mixed solvent (solvent (D)). To one of the containers was added 1.0 g of the above-obtained high concentration silica precursor mixture (molar amount of the silica precursor in terms of Si=1.5 mmol) to obtain a solution. To the other one of the containers was added 0.15 g of 1 N aqueous solution of sodium hydroxide (basic compound (B)) (0.15 mmol; pH=13.1; the vapor pressure of sodium hydroxide is substantially zero) to obtain another solution. The thus obtained two solutions were mixed together and stirred by means of a magnetic stirrer at 500 rpm and at room temperature for 30 minutes, thereby obtaining a coating composition.

The obtained coating composition was spin-coated on a surface of an optical PET film and a surface of a silicon wafer to thereby form thin films thereon. The thin films were dried at 100° C. for 1 minute, thereby obtaining cured thin films in each of which the fluid, silica precursor (A) had been converted into silica.

With respect to the optical PET film, the coating composition was also spin-coated on another surface thereof, and the resultant thin film was dried and cured in the same manner as mentioned above.

Subsequently, the optical PET film and the silicon wafer, each of which was coated with a cured thin film(s), were immersed in a water/ethanol mixed solvent (solvent for extracting organic compound (C)) (water/ethanol weight ratio=50/50), so as to remove polyethylene glycol dimethyl ether (organic compound (C)) from the cured thin films, thereby obtaining porous silica thin films.

The optical PET film and the silicon wafer, each of which was coated with the porous silica thin film(s), were dried at 100° C. for 1 minute.

With respect to each of the thus obtained optical PET film (hereinafter, referred to as a "coated PET film") which was coated with the porous silica thin films and the optical PET film (hereinafter, referred to as a "non-coated PET film") which was not coated with the porous silica thin film, the absolute reflectance was measured at an incidence angle of 12°. As a result, it was found that each of the optical PET films exhibited the minimum reflectance at a wavelength of 540 nm, and that the minimum reflectance (at 540 nm) of the uncoated PET film was as high as 8.2%, whereas the minimum reflectance (at 540 nm) of the coated PET film was suppressed to a value as small as 0.1%. Further, with respect to each of the coated PET film and the non-coated PET film, the light transmittance at 540 nm (i.e., the wavelength at which each of the optical PET films exhibited the minimum reflectance) was measured. As a result, it was found that the light transmittance of the non-coated PET film was as low as 91.5%, whereas the light transmittance of the coated PET film was improved to 99.0%.

With respect to the above-obtained silicon wafer, the refractive index thereof was measured, and found to be 1.210 (void ratio: 38.5%) which is satisfactory low.

Further, the pencil hardness of the porous silica thin film formed on the PET film was measured, and found to be HB.

Figure 2:
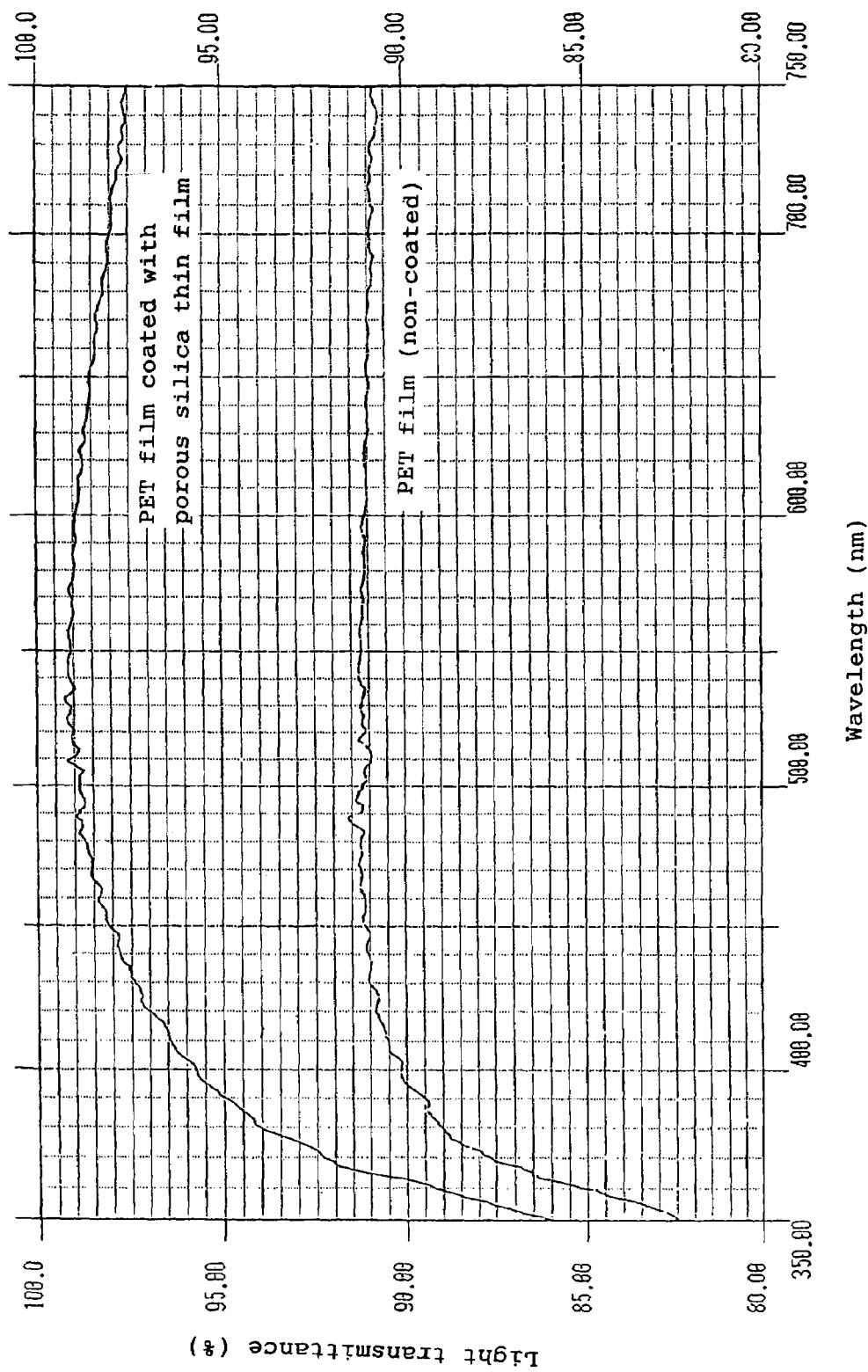
FIG. 2 is a chart showing the light transmittance of each of an uncoated polyethylene terephthalate (PET) film and a coated PET film (coated with a porous silica thin film) obtained in Example 1.

The results are shown in Table 1, FIG. 1 (reflectance) and FIG. 2 (light transmittance).

EXAMPLE 2

Substantially the same procedure as in Example 1 was repeated, except that 0.0065 g of polyethyleneimine (weight average molecular weight: 600; molar amount of nitrogen atoms: 0.15 mmol; pH=11.3; vapor pressure of the polyethyleneimine is substantially zero) was used instead of 0.15 g of 1 N aqueous solution of sodium hydroxide.

The obtained optical PET film coated with porous silica thin films exhibited a minimum reflectance of 0.1% at 525 nm, and a light transmittance of 99.2% at 525 nm (i.e., wavelength at which the optical PET film exhibited the minimum reflectance).

With respect to the obtained silicon wafer coated with a porous silica thin film, the refractive index and void ratio thereof were measured, and found to be 1.231 and 32.7%, respectively, which are satisfactory values.

The results are shown in Table 1.

EXAMPLE 3

Substantially the same procedure as in Example 1 was repeated, except that 0.0055 g of trimethylenetetramine (molar amount of nitrogen atoms: 0.15 mmol; pH=11.7; vapor pressure as measured at 100° C.: 0.27 kPa) was used instead of 0.15 g of 1 N aqueous solution of sodium hydroxide.

The obtained optical PET film coated with porous silica thin films exhibited a minimum reflectance of 0.2% at 520 nm, and a light transmittance of 99.0% at 520 nm (i.e., wavelength at which the optical PET film exhibited the minimum reflectance).

With respect to the obtained silicon wafer coated with a porous silica thin film, the refractive index and void ratio thereof were measured, and found to be 1.227 and 34.5%, respectively, which are satisfactory values.

The results are shown in Table 1.

EXAMPLE 4

Substantially the same procedure as in Example 1 was repeated, except that 0.0057 g of tetraethylenepentamine (molar amount of nitrogen atoms: 0.15 mmol; pH=11.6; vapor pressure as measured at 100° C.: less than 0.1 kPa) was used instead of 0.15 g of 1 N aqueous solution of sodium hydroxide.

The obtained optical PET film coated with porous silica thin films exhibited a minimum reflectance of 0.3% at 550 nm and a light transmittance of 99.1% at 550 nm (550 nm is the wavelength at which the optical PET film exhibited the minimum reflectance).

With respect to the obtained silicon wafer coated with a porous silica thin film, the refractive index and void ratio thereof were measured, and found to be 1.218 and 36.1%, respectively, which are satisfactory values.

The results are shown in Table 1.

EXAMPLE 5

Substantially the same procedure as in Example 1 was repeated, except that 0.15 g of a 20% by weight aqueous solution of tetra(n-propyl)ammonium hydroxide (molar amount of OH groups: 0.15 mmol; pH=13.0; vapor pressure of a tetra(n-propyl)ammonium hydroxide is substantially zero) was used instead of 0.15 g of 1 N aqueous solution of sodium hydroxide.

The obtained optical PET film coated with porous silica thin films exhibited a minimum reflectance of 0.3% at 560 nm, and a light transmittance of 99.0% at 560 nm (i.e., 560 nm is the wavelength at which the optical PET film exhibited the minimum reflectance).

With respect to the obtained silicon wafer coated with a porous silica thin film, the refractive index and void ratio thereof were measured, and found to be 1.193 and 43.5%, respectively, which are satisfactory values.

Further, the porous silica thin film formed on the PET film had a pencil hardness of HB.

The results are shown in Table 2.

EXAMPLE 6

Substantially the same procedure as in Example 2 was repeated, except that a mixed solvent containing 4.0 g of methyl ethyl ketone and 1.0 g of propylene glycol monomethyl ether was used instead of the mixed solvent (solvent (D)) containing 2.5 g of water and 2.5 g of propylene glycol monomethyl ether.

The obtained optical PET film coated with porous silica thin films exhibited a minimum reflectance of 0.1% at 540 nm, and a light transmittance of 99.0% at 540 nm (540 nm is the light wavelength at which the optical PET film exhibited the minimum reflectance).

With respect to the obtained silicon wafer coated with a porous silica thin film, the refractive index and void ratio thereof were measured, and found to be 1.235 and 31.6%, respectively, which are satisfactory values.

The results are shown in Table 2.

EXAMPLE 7

Substantially the same procedure as in Example 5 was repeated, except that a mixed solvent containing 4.0 g of methyl ethyl ketone and 1.0 g of propylene glycol monomethyl ether was used instead of the mixed solvent (solvent (D)) containing 2.5 g of water and 2.5 g of propylene glycol monomethyl ether.

The obtained optical PET film coated with porous silica thin films exhibited a minimum reflectance of 0.2% at 580 nm, and a light transmittance of 98.9% at 580 nm (i.e., 580 nm is the light wavelength at which the optical PET film exhibited the minimum reflectance).

With respect to the obtained silicon wafer coated with a porous silica thin film, the refractive index and void ratio thereof were measured, and found to be 1.203 and 40.8%, respectively, which are satisfactory values.

Further, the porous silica thin film formed on the PET film had a pencil hardness of H.

The results are shown in Table 2.

EXAMPLE 8

Substantially the same procedure as in Example 5 was repeated, except that the silica precursor/aliphatic polyether composition (i.e., the high concentration silica precursor mixture) was maintained at room temperature for 15 hours before mixing with solvent (D).

The obtained optical PET film coated with porous silica thin films exhibited a minimum reflectance of 0.3% at 575 nm, and a light transmittance of 99.1% at 575 nm (575 nm is the light wavelength at which the optical PET film exhibited the minimum reflectance).

With respect to the obtained silicon wafer coated with a porous silica thin film, the refractive index and void ratio thereof were measured, and found to be 1.197 and 42.2%, respectively, which are satisfactory values.

The results are shown in Table 2.

EXAMPLE 9

Substantially the same procedure as in Example 5 was repeated, except that the amount of a 20% by weight aqueous solution of tetra(n-propyl)ammonium hydroxide was changed to 0.015 g.

The obtained optical PET film coated with porous silica thin films exhibited a minimum reflectance of 0.1% at 540 nm, and a light transmittance of 99.0% at 540 nm (540 nm is the light wavelength at which the optical PET film exhibited the minimum reflectance).

With respect to the obtained silicon wafer coated with a porous silica thin film, the refractive index and void ratio thereof were measured, and found to be 1.209 and 38.9%, respectively, which are satisfactory values.

The results are shown in Table 3.

COMPARATIVE EXAMPLE 1

Substantially the same procedure as in Example 1 was repeated, except that 0.013 g of 20% by weight aqueous ammonia (molar amount of OH groups: 0.15 mmol; pH=11.4; vapor pressure of ammonia exceeds 1.3 kPa as explained above) was used instead of 0.15 g of 1 N aqueous solution of sodium hydroxide.

The obtained optical PET film coated with porous silica thin films exhibited a minimum reflectance as high as 3.1% at 540 nm, which means that the minimum reflectance of the optical PET film was not satisfactorily suppressed.

With respect to the obtained silicon wafer coated with a porous silica thin film, the refractive index thereof was measured, and was found to be 1.406 which is disadvantageously high. Further, it was observed that the porous silica thin film was partially delaminated from the PET film.

Furthermore, the porous silica film suffered scratches by the pencil hardness test using a 2B pencil.

The results are shown in Table 3.

COMPARATIVE EXAMPLE 2

Substantially the same procedure as in Comparative Example 1 was repeated, except that the coating composition was stirred at 40° C. for 2 hours before spincoating thereof on an optical PET film.

The obtained optical PET film coated with porous silica thin films exhibited a minimum reflectance of 1.6% at 440 nm, which means that the minimum reflectance of the optical PET film was not satisfactorily suppressed. Further, the thin film had a haze as high as 1.92%.

The results are shown in Table 3.

COMPARATIVE EXAMPLE 3

Substantially the same procedure as in Example 1 was repeated, except that 0.0052 g of diethylene triamine (molar amount of nitrogen atoms: 0.15 mmol; pH 11.5; vapor pressure as measured at 100° C.: 2.0 kPa) was used instead of 0.15 g of 1 N aqueous solution of sodium hydroxide.

The obtained optical PET film coated with porous silica thin films exhibited a minimum reflectance of 1.3% at 580 nm, which means that the minimum reflectance of the optical PET film was not satisfactorily suppressed.

With respect to the obtained silicon wafer coated with a porous silica thin film, the refractive index thereof was measured, and was found to be 1.343 which is disadvantageously high.

The results are shown in Table 3.

COMPARATIVE EXAMPLE 4

Substantially the same procedure as in Example 1 was repeated, except that 0.018 g of tris(hydroxymethyl)aminomethane (molar amount of nitrogen atoms: 0.15 mmol; pH=10.4; vapor pressure as measured at 100° C.: less than 0.1 kPa) was used instead of 0.15 g of 1 N aqueous solution of sodium hydroxide.

The obtained optical PET film coated with porous silica thin films exhibited a minimum reflectance of 1.6% at 550 nm, which means that the minimum reflectance of the optical PET film was not satisfactorily suppressed.

With respect to the obtained silicon wafer coated with a porous silica thin film, the refractive index thereof was measured, and was found to be 1.356 which is disadvantageously high.

The results are shown in Table 4.

COMPARATIVE EXAMPLE 5

Substantially the same procedure as in Example 1 was repeated, except that 0.015 g of 0.1 N aqueous solution of sodium hydroxide was used instead of 0.15 g of 1 N aqueous solution of sodium hydroxide.

The obtained optical PET film coated with porous silica thin films exhibited a minimum reflectance of 1.1% at 460 nm, which means that the minimum reflectance of the optical PET film was not satisfactorily suppressed.

With respect to the obtained silicon wafer coated with a porous silica thin film, the refractive index thereof was measured, and was found to be 1.337 which is disadvantageously high.

The results are shown in Table 4.

COMPARATIVE EXAMPLE 6

Substantially the same procedure as in Example 1 was repeated, except that the amount of 1 N aqueous solution of sodium hydroxide was changed to 1.5 g.

The obtained optical PET film coated with porous silica thin films exhibited a minimum reflectance of 1.0% at 580 nm, which means that the minimum reflectance of the optical PET film was not satisfactorily suppressed.

With respect to the obtained silicon wafer coated with a porous silica thin film, the refractive index thereof was measured, and was found to be 1.272 which is satisfactory. However, the light transmittance of the coated optical PET film was as low as 93.0% (at 580 nm), which means that the light transmittance of the PET film was not satisfactorily improved.

The results are shown in Table 4.

COMPARATIVE EXAMPLE 7

8.3 g of tetraethoxysilane (40 mmol) (the theoretical amount of silica which would be obtained from this amount of tetraethoxysilane is 2.4 g on the assumption that the whole amount of tetraethoxysilane is converted to silica by hydrolysis and polycondensation), 1.5 g of dimethyldiethoxysilane (10 mmol) (the theoretical amount of silica which would be obtained from this amount of dimethyldiethoxysilane is 0.74 g on the assumption that the whole amount of dimethyldiethoxysilane is converted to silica by hydrolysis and polycondensation), 11.5 g of ethanol, 6.5 g of water and 2.5 g of 0.1 N nitric acid were mixed together and stirred at room temperature for one day, thereby obtaining a fluid, silica precursor having a weight average molecular weight of 1,200. Then, 9.1 g of polyethylene glycol dimethyl ether (weight average molecular weight: 600) was added to the fluid, silica precursor, thereby obtaining a condensate mixture containing the fluid, silica precursor. With respect to the obtained condensate mixture, the weight ratio of the theoretical amount of silica (which would be obtained by polycondensation of the silica precursor) to the condensate mixture was 0.08, wherein the theoretical amount of silica was calculated on the assumption that the whole amount of silica precursor contained in the condensate mixture is converted to silica by polycondensation reaction. (Hereinafter, the obtained condensate mixture is referred to as "high concentration silica precursor mixture".)

Using the thus obtained high concentration silica precursor mixture, a coating composition was prepared and spin-coated on an optical PET film in the same manner as in Example 1, thereby obtaining an optical PET film having porous silica thin films formed on both surfaces thereof.

The obtained coated PET film exhibited the minimum reflectance of 2.2% at 520 nm, which is disadvantageously high. Further, the coated PET film exhibited a light transmittance of 94.6% at 520 nm (i.e., the wavelength at which the coated PET film exhibited the minimum reflectance), which means that the light transmittance of the PET film was not satisfactorily improved. Furthermore, it was observed that the porous silica thin film was partially delaminated from the PET film.

The results are shown in Table 4.

COMPARATIVE EXAMPLE 8

1.6 g of tetraethoxysilane (7.7 mmol), 2.9 g of water, 2.0 g of ethanol and 0.77 g of 1 N aqueous solution of sodium hydroxide were mixed together and stirred at room temperature, to thereby obtain a coating composition. During the stirring of the mixture, precipitation occurred in the mixture, so that the obtained coating composition containing a precipitate could not be coated on a substrate.

The results are shown in Table 4.

COMPARATIVE EXAMPLE 9

A dispersion of colloidal silica and an organosiloxane solution were prepared by the methods described in Unexamined Japanese Patent Application Laid-Open Specification No. Hei 6-299091.

Specifically, the dispersion of colloidal silica was prepared as follows. 50 g of tetraethoxysilane, 414 g of anhydrous ethanol and 14.6 g of 25% aqueous ammonia were placed in a sealed glass vessel, and was allowed to stand at room temperature for 4 days, to thereby obtain a 3% by weight ethanol dispersion of colloidal silica. The obtained ethanol dispersion of colloidal silica was filtered through a 0.2 μm-meshed Teflon membrane filter.

The organosiloxane solution was prepared as follows. 20.8 g of tetraethoxysilane, 172 g of anhydrous ethanol and 7.24 g of 0.15 N hydrochloric acid were placed in a sealed glass container, and was allowed to stand at room temperature for 4 days, to thereby obtain a 3% by weight organosiloxane solution. The obtained 3% by weight organosiloxane solution was filtered through a 0.2 μm-meshed Teflon membrane filter.

Then, 90 g of the above-obtained dispersion of colloidal silica and 10 g of the above-obtained organosiloxane solution were placed in a glass vessel and mixed together, and stirred for 2 hours, to thereby obtain a homogeneous solution. The homogeneous solution was aged for one day, thereby obtaining a coating composition.

The obtained coating composition was spin-coated on a surface of a PET film and dried at 100° C. for 1 minute to thereby form a cured thin film on the surface of the PET film. The resultant PET film had a haze as high as 2.1%. Further, the resultant PET film exhibited the minimum reflectance of 0.8% at 580 nm.

COMPARATIVE EXAMPLE 10

A sample PET film was obtained in substantially the same manner as in Example 2 of Unexamined Japanese Patent Application Laid-Open specification No. Hei 3-199043. Specifically, 17.83 g of methyltriethoxysilane, 13.82 g of ethanol and 22.24 g of 1-butanol were mixed to obtain a homogeneous solution. Then, 10.8 g of water and 0.49 g of phosphoric acid were added to the obtained solution, and the resultant was stirred for 60 minutes. To the resultant mixture was added 13.82 g of ethanol, 22.24 g of 1-butanol and 3.3 g of polyethylene glycol (weight average molecular weight: 2,000), followed by stirring for 10 minutes, thereby obtaining a coating composition.

Then, an optical PET film was immersed in the obtained coating composition, and was slowly withdrawn from the coating composition to thereby form thin films on the surfaces of the PET film. The resultant optical PET film was dried at 120° C. for 2 minutes and, then, immersed in ethanol to extract the polyether (polyethylene glycol) therefrom. It was observed that the thin films were partially delaminated from the PET film. The PET film was further dried at 120° C. for 2 minutes, thereby obtaining a sample PET film.

The obtained sample PET film exhibited a reflectance of not more than 1% over a wide range of wavelength. However, the sample PET film had rough surfaces due to the partial release of the thin films from the sample PET film. Further, the thin film formed on the sample PET film was very brittle such that it was unable to pass the pencil hardness test using a 2B pencil.

EXAMPLE 10

7.1 g of methyltriethoxysilane (40 mmol) and 12.5 g of tetraethoxysilane (60 mmol) were mixed together to obtain a homogeneous mixture thereof. To the obtained mixture was dropwise added a mixture of 12.9 g of water and 0.06 g of phosphoric acid to perform hydrolysis and polycondensation at 50° C. for 5 hours, thereby obtaining a reaction mixture containing fluid, silica precursor (A). To 1.33 g of the obtained reaction mixture was added a mixture of 0.064 g of 1N aqueous solution of sodium hydroxide, 2.89 g of water, 7.23 g of propylene glycol monomethyl ether and 4.34 g of methyl isobutyl ketone, followed by addition of 0.20 g of glyceryl triacetate ($C_9H_{14}O_6$; molecular weight: 218.2; oxygen/carbon atomic ratio: 0.67). The resultant mixture was stirred at room temperature for 1 hour, thereby obtaining a silica precursor/basic compound/glyceryl triacetate composition (coating composition).

The obtained coating composition was spin-coated on a surface of an optical PET film at 1000 rpm for 30 seconds, to thereby form a thin film on the surface of the optical PET film. The optical PET film (having a thin film formed on the surface thereof) was dried at 120° C. for 2 minutes and, then, immersed in a water/ethanol extraction solvent (water/ethanol weight ratio=50/50) for 30 seconds to extract glyceryl triacetate therefrom. Then, the optical PET film was further dried at 120° C. for 30 seconds, thereby obtaining an optical PET film coated with a porous silica thin film.

With respect to the resultant PET film, the uncoated surface thereof was roughened with a sandpaper, and the roughened surface was coated with a black ink, so as to prevent a reflection from occurring on the uncoated surface. Then, the absolute reflectance of the PET film at an incidence angle of 12° was measured with respect to the coated portions thereof. As a result, it was found that the PET film exhibited the minimum reflectance as low as 0.15% at 610 nm. Further, the PET film had a haze as low as 0.68%, and the pencil hardness of the thin film formed on the PET film was H.

The results are shown in Table 5.

EXAMPLE 11

Substantially the same procedure as in Example 10 was repeated, except that sucrose octaacetate ($C_{28}H_{38}O_{19}$; molecular weight: 678.6; oxygen/carbon atomic ratio: 0.68) was used instead of glyceryl triacetate.

The obtained coated PET film exhibited a minimum reflectance of 0.10% at 690 nm. Further, the coated PET film had a haze of 0.73%, and the pencil hardness of the porous silica thin film formed on the PET film was H.

The results are shown in Table 5.

EXAMPLE 12

Substantially the same procedure as in Example 7 was repeated to obtain a coated PET film, except that polyvinyl methyl ether (manufactured and sold by Tokyo Kasei Kogyo Co., Ltd, Japan) was used instead of polyethylene glycol dimethyl ether, and a water/acetone mixed solvent (water/acetone weight ratio=20/80) was used as an extraction solvent (instead of a water/ethanol extraction solvent). With respect to the obtained coated PET film, the absolute reflection thereof was measured by the same method as described in Example 10. As a result, it was found that the minimum reflectance of the coated PET film was 0.1% at 575 nm.

Further, it was found that the coated PET film had a light transmittance of 99.0% at 575 nm (i.e., the wavelength at which the optical PET film exhibited the minimum reflectance), and a haze of 0.98%. The pencil hardness of the thin film formed on the PET film was HB.

The results are shown in Table 5.

EXAMPLE 13

Substantially the same procedure as in Example 10 was repeated, except that polyethylene glycol methyl ether (polyethylene glycol methyl ether/silica weight ratio=1) was used instead of glycerol triacetate. In Example 13, the extraction time was extended to 120 seconds. As a result, it was found that the obtained coated PET film exhibited a minimum reflectance as low as 0.8% at 630 nm. Further, the obtained coated PET film had a haze as low as 0.95%, and the pencil hardness of the porous silica thin film formed on the PET film was H.

The results are shown in Table 6.

EXAMPLE 14

Substantially the same procedure as in Example 13 was repeated, except that the extraction time was extended to 600 seconds.

The obtained coated PET film exhibited a minimum reflectance of 0.3% at 630 nm. Further, the obtained coated PET film had a haze of 0.94%, and the pencil hardness of the porous silica thin film formed on the PET film was H.

The results are shown in Table 6.

COMPARATIVE EXAMPLE 11

Substantially the same procedure as in Example 10 was repeated, except that 1,2-dimethoxyethane (boiling point: 85° C.; 1,2-dimethoxyethane/silica weight ratio=3) was used instead of glyceryl triacetate.

The obtained coated PET film had a haze of 0.68%, and the pencil hardness of the thin film formed on the PET film was 2H. Thus, the haze and the pencil hardness were satisfactory. However, the obtained coated PET film exhibited a minimum reflectance as high as 3.4% at 590 nm, which means that the minimum reflectance of the optical PET film was not satisfactorily suppressed.

The results are shown in Table 6.

EXAMPLE 15

222 g of methyltriethoxysilane (1.245 mol) (the theoretical amount of silica which would be obtained from this amount of methyltriethoxysilane is 83.4 g on the assumption that the whole amount of methyltriethoxysilane is converted to silica by hydrolysis and polycondensation) and 72 g of tetraethoxysilane (0.346 mol) (the theoretical amount of silica which would be obtained from this amount of tetraethoxysilane is 20.8 g on the assumption that the whole amount of tetraethoxysilane is converted to silica by hydrolysis and polycondensation) were mixed together to obtain a homogeneous mixture thereof. To the obtained mixture was gradually added a mixture of 92 g of water and 19.1 ml of an ion exchange resin (trade name: DIAION RCP160; manufactured and sold by MITSUBISHI CHEMICAL CORPORATION, Japan) (amount of ion exchange groups=1.5 meq per ml of the resin). Then, hydrolysis and polycondensation were performed at 50° C. for 5 hours, thereby obtaining a reaction mixture containing fluid, silica precursor (A).

Subsequently, the obtained reaction mixture was subjected to filtration to thereby remove the ion exchange resin therefrom. To the resultant mixture was added 104.2 g of polyethylene glycol dimethyl ether (organic compound (C)) (weight average molecular weight: 600; substantially no boiling point), followed by addition of propylene glycol monomethyl ether, thereby obtaining 1042 g of a mixture containing fluid, silica precursor (A). With respect to the obtained mixture, the weight ratio of the theoretical amount of silica (which would be obtained by polycondensation of the silica precursor (A)) to the mixture was 0.1, wherein the theoretical amount of silica was calculated on the assumption that the whole amount of silica precursor (A) contained in the mixture is converted to silica by polycondensation reaction. (Hereinafter, the above-mentioned mixture is referred to as "high concentration silica precursor mixture".) The weight average molecular weight of the silica precursor (A) present in the high concentration silica mixture was 7,600.

Separately from the above, in each of two vessels, 4.0 g of methyl isobutyl ketone and 1.0 g of propylene glycol monomethyl ether were mixed together to obtain a mixed solvent. To one of the vessels was added 1.0 g of the above-obtained high concentration silica precursor mixture (molar amount of the silica precursor in terms of Si=1.5 mmol) to obtain a solution. To the other one of the vessels was added 0.15 g of a 20% by weight aqueous solution of tetra(n-propyl)ammonium hydroxide (molar mount of OH groups: 0.15 mmol; pH=13.0; the vapor pressure of tetra(n-propyl)ammonium hydroxide is substantially zero) to obtain another solution. Thus obtained two solutions were mixed together to thereby obtain a coating composition.

The obtained coating composition was spin-coated on a surface of an optical PET film to form a thin film thereon. The optical PET film (having a thin film formed on the surface thereof) was dried at 120° C. for 2 minutes and, then, immersed in a water/ethanol mixed solvent (extraction solvent) (water/ethanol weight ratio=50/50) for 30 seconds. Then, the optical PET film was further dried at 120° C. for 2 minutes, thereby obtaining an optical PET film coated with a porous silica thin film.

With respect to the resultant optical PET film, the uncoated surface thereof was roughened with a sandpaper and the roughened surface was coated with a black ink, so as to prevent a reflection from occurring on the uncoated surface. Then, the absolute reflectance of the PET film at an incidence angle of 12° was measured with respect to the coated portions thereof. As a result, it was found that the PET film exhibited the minimum reflectance as low as 0.15% at 600 nm. Further, the PET film had a haze as low as 0.92%, and the pencil hardness of the porous silica thin film formed on the PET film was HB.

The results are shown in Table 7.

EXAMPLE 16

Substantially the same procedure as in Example 15 was repeated, except that 22.5 mg of a 2.25% by weight aqueous solution of tetra(n-propyl)ammonium hydroxide was used instead of 0.15 g of a 20% by weight aqueous solution of tetra(n-propyl)ammonium hydroxide.

The obtained coated PET film exhibited a minimum reflectance of 0.5% at 610 nm. Further, the obtained PET film had a haze of 0.88%, and the pencil hardness of the porous silica thin film formed on the PET film was H.

The results are shown in Table 7.

EXAMPLE 17

Substantially the same procedure as in Example 15 was repeated, except that 75.0 mg of a 2.25% by weight aqueous solution of tetra(n-propyl)ammonium hydroxide was used instead of 0.15 g of a 20% by weight aqueous solution of tetra(n-propyl)ammonium hydroxide, and that the obtained coating composition was coated not only on a PET film, but also on a silicon wafer.

The obtained optical PET film exhibited a minimum reflectance of 0.15% at 610 nm. Further, the obtained PET film had a haze of 0.81%, and the pencil hardness of the porous silica thin film formed on the PET film was H.

With respect to the obtained silicon wafer coated with a porous silica thin film, the refractive index thereof was measured, and was found to be 1.21.

The results are shown in Table 7.

EXAMPLE 18

Substantially the same procedure as in Example 17 was repeated, except that the amount of the 2.25% by weight aqueous solution of tetra(n-propyl)ammonium hydroxide was changed to 0.105 g.

The obtained coated PET film exhibited a minimum reflectance of 0.15% at 590 nm. Further, the obtained coated PET film had a haze of 0.95%, and the pencil hardness of the porous silica thin film formed on the PET film was H.

With respect to the obtained silicon wafer coated with a porous silica thin film, the refractive index thereof was measured, and was found to be 1.21.

The results are shown in Table 7.

EXAMPLE 19

Substantially the same procedure as in Example 15 was repeated, except that 0.18 g of a 22.5% by weight aqueous solution of tetra(n-propyl)ammonium hydroxide was used instead of 0.15 g of a 20% by weight aqueous solution of tetra(n-propyl)ammonium hydroxide, and that the obtained coating composition was spin-coated on a silicon wafer to thereby form a porous silica thin film on the surface the silicon wafer.

With respect to the resultant silicon wafer coated with a porous silica thin film, the refractive index thereof was measured, and was found to be 1.27.

The results are shown in Table 7.

EXAMPLE 20

Substantially the same procedure as in Example 19 was repeated, except that the amount of the 22.5% by weight aqueous solution of tetra(n-propyl)ammonium hydroxide was changed to 0.27 g.

With respect to the obtained silicon wafer coated with a porous silica thin film, the refractive index thereof was measured, and was found to be 1.31.

The results are shown in Table 8.

EXAMPLE 21

Substantially the same procedure as in Example 15 was repeated, except that the high concentration silica precursor mixture obtained in Example 1 was used, that 47 mg of a 22.5% by weight aqueous solution of tetra(n-propyl)ammonium hydroxide was used instead of 0.15 g of a 20% by weight aqueous solution of tetra(n-propyl)ammonium hydroxide, and that the obtained coating composition was coated not only on a PET film, but also on a silicon wafer.

The obtained coated PET film exhibited a minimum reflectance of 0.10% at 600 nm. Further, the obtained PET film had a haze of 0.83%, and the pencil hardness of the porous silica thin film formed on the PET film was H.

With respect to the obtained silicon wafer coated with a porous silica thin film, the refractive index thereof was measured, and was found to be 1.21.

The results are shown in Table 8.

EXAMPLE 22

Substantially the same procedure as in Example 18 was repeated, except that the high concentration silica precursor mixture obtained in Example 1 was used.

The obtained coated PET film exhibited a minimum reflectance of 0.15% at 590 nm. Further, the obtained PET film had a haze of 0.92%, and the pencil hardness of the porous silica thin film formed on the PET film was H.

With respect to the obtained silicon wafer coated with a porous silica thin film, the refractive index thereof was measured, and was found to be 1.21.

The results are shown in Table 8.

EXAMPLE 23

Substantially the same procedure as in Example 16 was repeated, except that the high concentration silica precursor mixture obtained in Example 1 was used, that 0.23 g of a 22.5% by weight aqueous solution of tetra(n-propyl)ammonium hydroxide was used instead of 0.15 g of a 20% by weight aqueous solution of tetra(n-propyl)ammonium hydroxide, and that the obtained coating composition was coated not only on a PET film, but also on a silicon wafer.

The obtained coated PET film exhibited a minimum reflectance of 0.25% at 610 nm. Further, the obtained PET film had a haze of 0.97%, and the pencil hardness of the porous silica thin film formed on the PET film was HB.

With respect to the obtained silicon wafer coated with a porous silica thin film, the refractive index thereof was measured, and was found to be 1.30.

The results are shown in Table 8.

EXAMPLE 24

Substantially the same procedure as in Example 23 was repeated, except that the amount of the 22.5% by weight aqueous solution of tetra(n-propyl)ammonium hydroxide was changed to 0.27 g.

The obtained optical PET film coated with porous silica thin films exhibited a minimum reflectance of 0.35% at 580 nm. Further, the obtained PET film had a haze of 0.89%, and the pencil hardness of the porous silica thin film formed on the PET film was HB.

With respect to the obtained silicon wafer coated with a porous silica thin film, the refractive index thereof was measured, and was found to be 1.32.

The results are shown in Table 8.

EXAMPLE 25

7.4 g of 1,2-bis(triethoxysilyl)ethane (0.021 mol) (the theoretical amount of silica which would be obtained from this amount of 1,2-bis(triethoxysilyl)ethane was 2.76 g on the assumption that the whole amount of 1,2-bis(triethoxysilyl)ethane is converted to silica by hydrolysis and polycondensation), 7.4 g of methyltriethoxysilane (0.042 mol) (the theoretical amount of silica which would be obtained from this amount of methyltriethoxysilane is 2.79 g on the assumption that the whole amount of methyltriethoxysilane is converted to silica by hydrolysis and polycondensation) and 4.8 g of tetraethoxysilane (0.023 mol) (the theoretical amount of silica which would be obtained from this amount of tetraethoxysilane is 1.38 g on the assumption that the whole amount of tetraethoxysilane is converted to silica by hydrolysis and polycondensation) were mixed together to thereby obtain a homogeneous mixture thereof. To the obtained mixture was gradually added a mixture of 6.2 g of water (0.34 mol) and 0.06 g of phosphoric acid to perform hydrolysis and polycondensation at 50° C., thereby obtaining a reaction mixture containing fluid, silica precursor (A).

The weight average molecular weight of the fluid, silica precursor (A) present in the reaction mixture was 3,760.

Subsequently, 6.8 g of polyethylene glycol dimethyl ether (weight average molecular weight: 600), 6.8 g of water and 29.8 g of propylene glycol monomethyl ether were added to the above-obtained reaction mixture to thereby obtain a mixture containing the fluid, silica precursor (A). With respect to the obtained mixture, the weight ratio of the theoretical amount of silica (which would be obtained by polycondensation of the silica precursor (A)) to the mixture was 0.1, wherein the theoretical amount of silica was calculated on the assumption that the whole amount of silica precursor (A) contained in the mixture is converted to silica by polycondensation reaction. (Hereinafter, the obtained mixture is referred to as "high concentration silica precursor mixture".)

Separately from the above, 5 g of water and 5 g of propylene glycol monomethyl ether were mixed together to obtain a mixed solvent. Then, 1.0 g of the above-obtained high concentration silica precursor mixture and 0.15 g of a 20% by weight aqueous solution of tetra(n-propyl)ammonium hydroxide (pH=13.0; the vapor pressure of tetra(n-propyl)ammonium hydroxide is substantially zero) were added to the mixed solvent to obtain a coating composition.

The obtained coating composition was spin-coated on a surface of an optical PET film, followed by drying at 100° C. for 1 minute. The coating composition was also spin-coated on another surface of the PET film, followed by drying in the same manner as mentioned above.

The optical PET film having thin films formed on the surfaces thereof was immersed in a water/ethanol mixed solvent (extraction solvent) (water/ethanol weight ratio=50/50) for 10 seconds at room temperature and, then, the optical PET film was further dried at 100° C. for 1 minute, thereby obtaining an optical PET film coated with porous silica thin films.

The obtained coated PET film exhibited the minimum reflection at 540 nm. The optical PET film (non-coated PET film) which was not coated with porous silica thin films exhibited the minimum reflectance of 8.2% (at 540 nm), whereas the minimum reflectance (at 540 nm) of the coated PET film was suppressed to a value as small as 0.1%.

Further, a rectangular strip was cut out of each of the above-obtained coated PET film and the coated PET film obtained in Example 1. The rectangular strip was wound around a rod having a diameter of 2 cm, and then unwound. Then, this operation (involving the winding and subsequent unwinding of the strip) was repeated 9 times (i.e., the operation was performed 10 times in total). The surface of the resultant rectangular strip was observed under an optical microscope (trade name: BH-2; manufactured and sold by Olympus Optical Co., Ltd., Japan) at a magnification of ×100. Specifically, the porous silica thin film was observed to examine whether or not any broken pieces were detached from the porous silica thin film by the above-mentioned operation, so as to evaluate the adhesion strength between the porous silica thin film and the substrate (i.e., the PET film). In the observation of the surface of the coated PET film obtained in Example 1, cross-shaped marks (which were left on the surface of the coated PET film by the detachment of the broken pieces of the porous silica thin film) were observed. On the other hand, in the observation of the surface of the coated PET film obtained in Example 25, no cross-shaped marks were observed.

EXAMPLE 26

In each of two vessels, 4.0 g of methyl isobutyl ketone and 1.0 g of propylene glycol monomethyl ether were mixed together to obtain a mixed solvent. To one of the vessels was added 1.8 g of the high concentration silica precursor mixture obtained in Example 1 (molar amount of the silica precursor in terms of Si=2.74 mmol) and 0.33 g of water to obtain a solution. To the other one of the vessels was added 50 mg of a 22.5% by weight aqueous solution of tetra(n-propyl)ammonium hydroxide (molar amount of OH groups: 0.055 mmol; pH=13.0; the vapor pressure of tetra(n-propyl)ammonium hydroxide is substantially zero; tetra(n-propyl)ammonium hydroxide (basic compound)/Si molar ratio=0.02) and 73 mg of tetra(n-propyl)ammonium bromide (0.274 mmol) to obtain another solution. Thus obtained two solutions were mixed together to thereby obtain a coating composition.

With respect to the obtained coating composition, the viscosity thereof was measured 1 hour after the production thereof and 20 hours after the production thereof, and found to be 0.792 mPa·s and 0.798 mPa·s, respectively. Thus, the coating composition showed a very small fluctuation of the viscosity thereof.

Further, the coating composition was applied to a surface of a PET film to form a porous silica thin film on the surface thereof. With respect to the PET film having a porous silica thin film formed thereon, the minimum reflectance thereof was measured 1 hour after the formation of the thin film and 20 hours after the formation of the thin film, and was found that the PET film exhibited a minimum reflectance of 0.15% at 670 nm 1 hour after the formation of the thin film and a minimum reflectance of 0.10% at 670 nm 20 hours after the formation of the thin film. Thus, the PET film showed no fluctuation of the wavelength at which the minimum reflectance is observed.

COMPARATIVE EXAMPLE 12

Substantially the same procedure as in Example 26 was repeated except that tetra(n-propyl)ammonium bromide was not used.

With respect to the obtained coating composition, the viscosity thereof was measured 1 hour after the production thereof and 20 hours after the production thereof, and found to be 0.86 mPa·s and 0.94 mPa·s, respectively. Thus, the coating composition showed a disadvantageous large fluctuation of the viscosity thereof.

COMPARATIVE EXAMPLE 13

The high concentration silica precursor mixture obtained in Example 1 was condensed, followed by addition of a 22.5% by weight aqueous solution of tetra(n-propyl)ammonium hydroxide and ethanol, thereby obtaining an ethanol solution (coating composition) containing 0.9% by weight of water, 0.2% by weight of tetra(n-propyl)ammonium hydroxide and 2.3% by weight of propylene glycol monomethyl ether. With respect to the obtained coating composition, the molar ratio of the basic compound present therein to Si atoms present therein was 0.065. Further, with respect to the obtained coating composition, the weight ratio of the theoretical amount of silica (which would be obtained by polycondensation of the fluid, silica precursor (contained in the coating composition)) to the coating composition was 0.01, wherein the theoretical amount of silica was calculated on the assumption that the whole amount of silica precursor contained in the ethanol coating composition is converted to silica by polycondensation reaction. The coating composition contained 3.1% by weight, based on the weight of the coating composition, of compounds (solvents) having a hydroxyl group and a boiling point of 100° C. or more. When the coating composition was applied to a silicon wafer by spin-coating to form a thin film, the formed thin film had a rough surface.

TABLE 1

|  | Example 1 | Example 2 | Example 3 | Example 4 |
| --- | --- | --- | --- | --- |
| Fluid, silica precursor (A) | | | | |
| Alkoxysilane (molar ratio) | MTES/TEOS = 80/20 | MTES/TEOS = 80/20 | MTES/TEOS = 80/20 | MTES/TEOS = 80/20 |
| Acid catalyst | Phosphoric acid | Phosphoric acid | Phosphoric acid | Phosphoric acid |
| Molar amount (per mole of Si atoms) | 0.006 | 0.006 | 0.006 | 0.006 |
| Weight average molecular weight | 31,400 | 31,400 | 31,400 | 31,400 |
| Basic compound (B) | | | | |
| Type of basic compound | NaOH | PEI | TETA | TEPA |
| pH | 13.1 | 11.3 | 11.7 | 11.6 |
| Vapor pressure (kPa) | Substantially zero | Substantially zero | 0.27 | <0.1 |
| Molar amount (per mole of Si atoms) | 0.10 | 0.10 | 0.10 | 0.10 |
| Organic compound (C) | | | | |
| Type of organic compound | PEGDME | PEGDME | PEGDME | PEGDME |
| Molar amount (per mole of Si atoms) | 1.0 | 1.0 | 1.0 | 1.0 |
| Boiling point (° C.) | No boiling point | No boiling point | No boiling point | No boiling point |
| Coating composition | | | | |
| Solvent (D) (coating solvent) (molar ratio) | Water/PGME = 50/50 | Water/PGME = 50/50 | Water/PGME = 50/50 | Water/PGME = 50/50 |
| Appearance | Good | Good | Good | Good |
| Thin film forming conditions | | | | |
| Substrate | PET and silicon wafer | PET and silicon wafer | PET and silicon wafer | PET and silicon wafer |
| Curing temperature (° C.) | 100 | 100 | 100 | 100 |
| Curing time (sec) | 60 | 60 | 60 | 60 |
| Extraction solvent (molar ratio) | Water/EtOH = 50/50 | Water/EtOH = 50/50 | Water/EtOH = 50/50 | Water/EtOH = 50/50 |
| Extraction time (sec) | 10 | 10 | 10 | 10 |
| Drying temperature (° C.) | 100 | 100 | 100 | 100 |
| Drying time (sec) | 60 | 60 | 60 | 60 |
| Other treatments | — | — | — | — |
| Properties of thin film | | | | |
| Reflectance (%) | 0.1 | 0.1 | 0.2 | 0.3 |
| Refractive index (1.95 eV) | 1.210 | 1.231 | 1.227 | 1.218 |
| Void ratio (%) | 38.5 | 32.7 | 34.5 | 36.1 |
| Light transmittance (%) | 99.0 | 99.2 | 99.0 | 99.1 |
| Haze (%) | — | — | — | — |
| Pencil Hardness | HB | — | — | — |
| Appearance | Good | Good | Good | Good |

Notes:
MTES = Methyltriethoxysilane
TEOS = Tetraethoxysilane
PEI = Polyethyleneimine
TETA = Triethylene tetramine
TEPA = Tetraethylene pentamine
PEGDME = Polyethylene glycol dimethyl ether
PGME = Propylene glycol monomethyl ether

TABLE 2

|  | Example 5 | Example 6 | Example 7 | Example 8 |
| --- | --- | --- | --- | --- |
| Fluid, silica precursor (A) | | | | |
| Alkoxysilane (molar ratio) | MTES/TEOS = 80/20 | MTES/TEOS = 80/20 | MTES/TEOS = 80/20 | MTES/TEOS = 80/20 |
| Acid catalyst | Phosphoric acid | Phosphoric acid | Phosphoric acid | Phosphoric acid |
| Molar amount (per mole of Si atoms) | 0.006 | 0.006 | 0.006 | 0.006 |

TABLE 2-continued

|  | Example 5 | Example 6 | Example 7 | Example 8 |
|---|---|---|---|---|
| Weight average molecular weight | 31,400 | 31,400 | 31,400 | 31,400 |
| Basic compound (B) | | | | |
| Type of basic compound | TPAH | PEI | TPAH | TPAH |
| pH | 13.0 | 11.3 | 13.0 | 13.0 |
| Vapor pressure (kPa) | Substantially zero | Substantially zero | Substantially zero | Substantially zero |
| Molar amount (per mole of Si atoms) | 0.10 | 0.10 | 0.10 | 0.10 |
| Organic compound (C) | | | | |
| Type of organic compound | PEGDME | PEGDME | PEGDME | PEGDME |
| Molar amount (per mole of Si atoms) | 1.0 | 1.0 | 1.0 | 1.0 |
| Boiling point (° C.) | No boiling point | No boiling point | No boiling point | No boiling point |
| Coating composition | | | | |
| Solvent (D) (coating solvent) (molar ratio) | Water/PGME = 50/50 | PGME/MEK = 20/80 | PGME/MEK = 20/80 | Water/PGME = 50/50 |
| Appearance | Good | Good | Good | Good |
| Thin film forming conditions | | | | |
| Substrate | PET and silicon wafer | PET and silicon wafer | PET and silicon wafer | PET and silicon wafer |
| Curing temperature (° C.) | 100 | 100 | 100 | 100 |
| Curing time (sec) | 60 | 60 | 60 | 60 |
| Extraction solvent (molar ratio) | Water/EtOH = 50/50 | Water/EtOH = 50/50 | Water/EtOH = 50/50 | Water/EtOH = 50/50 |
| Extraction time (sec) | 10 | 10 | 10 | 10 |
| Drying temperature (° C.) | 100 | 100 | 100 | 100 |
| Drying time (sec) | 60 | 60 | 60 | 60 |
| Other treatments | — | — | — | Allowed to stand at room temperature for 15 hours |
| Properties of thin film | | | | |
| Reflectance (%) | 0.3 | 0.1 | 0.2 | 0.3 |
| Refractive index (1.95 eV) | 1.193 | 1.235 | 1.203 | 1.197 |
| Void ratio (%) | 43.5 | 31.6 | 40.8 | 42.2 |
| Light transmittance (%) | 99.0 | 99.0 | 98.9 | 99.1 |
| Haze (%) | — | — | — | — |
| Pencil Hardness | HB | — | HB | — |
| Appearance | Good | Good | Good | Good |

Notes:
MTES = Methyltriethoxysilane
TEOS = Tetraethoxysilane
TPAH = Tetrapropylammonium hydroxide
PEI = Polythyleneimine
PEGDME = Polyethylene glycol dimethyl ether
PGME = Propylene glycol monomethyl ether
MEK = Methyl ethyl ketone

TABLE 3

|  | Example 9 | Comparative Example 1 | Comparative Example 2 | Comparative Example 3 |
|---|---|---|---|---|
| Fluid, silica precursor (A) | | | | |
| Alkoxysilane (molar ratio) | MTES/TEOS = 80/20 | MTES/TEOS = 80/20 | MTES/TEOS = 80/20 | MTES/TEOS = 80/20 |
| Acid catalyst | Phosphoric acid | Phosphoric acid | Phosphoric acid | Phosphoric acid |
| Molar amount (per mole of Si atoms) | 0.006 | 0.006 | 0.006 | 0.006 |
| Weight average molecular weight | 31,400 | 31,400 | 31,400 | 31,400 |
| Basic compound (B) | | | | |
| Type of basic compound | TPAH | Aqueous NH$_3$ | Aqueous NH$_3$ | DETA |
| pH | 13.0 | 11.4 | 11.4 | 11.5 |
| Vapor pressure (kPa) | Substantially zero | >1.3 | >1.3 | 2.0 |

TABLE 3-continued

|  | Example 9 | Comparative Example 1 | Comparative Example 2 | Comparative Example 3 |
|---|---|---|---|---|
| Molar amount (per mole of Si atoms) | 0.01 | 0.1 | 0.1 | 0.1 |
| Organic compound (C) |  |  |  |  |
| Type of organic compound | PEGDME | PEGDME | PEGDME | PEGDME |
| Molar amount (per mole of Si atoms) | 1.0 | 1.0 | 1.0 | 1.0 |
| Boiling point (° C.) | No boiling point | No boiling point | No boiling point | No boiling point |
| Coating composition |  |  |  |  |
| Solvent (D) (coating solvent) (molar ratio) | Water/PGME = 50/50 | Water/PGME = 50/50 | Water/PGME = 50/50 | Water/PGME = 50/50 |
| Appearance | Good | Good | Good | Good |
| Thin film forming conditions |  |  |  |  |
| Substrate | PET and silicon wafer | PET and silicon wafer | PET | PET and silicon wafer |
| Curing temperature (° C.) | 100 | 100 | 100 | 100 |
| Curing time (sec) | 60 | 60 | 60 | 60 |
| Extraction solvent (molar ratio) | Water/EtOH = 50/50 | Water/EtOH = 50/50 | Water/EtOH = 50/50 | Water/EtOH = 50/50 |
| Extraction time (sec) | 10 | 10 | 10 | 10 |
| Drying temperature (° C.) | 100 | 100 | 100 | 100 |
| Drying time (sec) | 60 | 60 | 60 | 60 |
| Other treatments | — | — | Stirred at 40° C. for 2 hours | — |
| Properties of thin film |  |  |  |  |
| Reflectance (%) | 0.1 | 3.1 | 1.6 | 1.3 |
| Refractive index (1.95 eV) | 1.209 | 1.406 | — | 1.343 |
| Void ratio (%) | 38.9 |  |  |  |
| Light transmittance (%) | 99.0 | — | — | — |
| Haze (%) | — | — | 1.92 | — |
| Pencil Hardness | — | 2B | — | — |
| Appearance | Good | Partially delaminated | Light scattering observed | Good |

Notes:
MTES = Methyltriethoxysilane
TEOS = Tetraethoxysilane
TPAH = Tetrapropylammonium hydroxide
DETA = Diethylene triamine
PEGDME = Polyethylene glycol dimethyl ether
PGME = Propylene glycol monomethyl ether

TABLE 4

|  | Comparative Example 4 | Comparative Example 5 | Comparative Example 6 | Comparative Example 7 | Comparative Example 8 |
|---|---|---|---|---|---|
| Fluid, silica precursor (A) |  |  |  |  |  |
| Alkoxysilane (molar ratio) | MTES/TEOS = 80/20 | MTES/TEOS = 80/20 | MTES/TEOS = 80/20 | DMDES/TEOS = 20/80 | TEOS |
| Acid catalyst | Phosphoric acid | Phosphoric acid | Phosphoric acid | Nitric acid | — |
| Molar amount (per mole of Si atoms) | 0.006 | 0.006 | 0.006 | 0.005 | — |
| Weight average molecular weight | 31,400 | 31,400 | 31,400 | 1,200 | — |
| Basic compound (B) |  |  |  |  |  |
| Type of basic compound | THMAM | NaOH | NaOH | NaOH | NaOH |
| pH | 10.4 | 13.1 | 13.1 | 13.1 | 13.1 |
| Vapor pressure (kPa) | <0.1 | Substantially zero | Substantially zero | Substantially zero | Substantially zero |
| Molar amount (per mole of Si atoms) | 0.1 | 0.001 | 1.00 | 0.1 | 0.1 |
| Organic compound (C) |  |  |  |  |  |
| Type of organic compound | PEGDME | PEGDME | PEGDME | PEGDME | — |
| Molar amount (per mole of Si atoms) | 1.0 | 1.0 | 1.0 | 1.0 | — |

TABLE 4-continued

|  | Comparative Example 4 | Comparative Example 5 | Comparative Example 6 | Comparative Example 7 | Comparative Example 8 |
|---|---|---|---|---|---|
| Boiling point (° C.) | No boiling point | No boiling point | No boiling point | No boiling point | — |
| Coating composition |  |  |  |  |  |
| Solvent (D) (coating solvent) (molar ratio) | Water/PGME = 50/50 | Water/PGME = 50/50 | Water/PGME = 50/50 | Water/EtOH | Water/EtOH |
| Appearance | Good | Good | Good | Good | Precipitation |
| Thin film forming conditions |  |  |  |  |  |
| Substrate | PET and silicon wafer | PET and silicon wafer | PET and silicon wafer | PET | — |
| Curing temperature (° C.) | 100 | 100 | 100 | 100 | — |
| Curing time (sec) | 60 | 60 | 60 | 60 | — |
| Extraction solvent (molar ratio) | Water/EtOH = 50/50 | Water/EtOH = 50/50 | Water/EtOH = 50/50 | Water/EtOH = 50/50 | — |
| Extraction time (sec) | 10 | 10 | 10 | 10 | — |
| Drying temperature (° C.) | 100 | 100 | 100 | 100 | — |
| Drying time (sec) | 60 | 60 | 60 | 60 | — |
| Other treatments | — | — | — | — | — |
| Properties of thin film |  |  |  |  |  |
| Reflectance (%) | 1.6 | 1.1 | 1.0 | 2.2 | — |
| Refractive index (1.95 eV) | 1.356 | 1.337 | 1.272 | — | — |
| Void ratio (%) |  |  |  |  |  |
| Light transmittance (%) | — | — | 93.0 | 94.6 | — |
| Haze (%) | — | — | — | — | — |
| Pencil Hardness | — | — | — | — | — |
| Appearance | Good | Good | Light scattering observed | Partially delaminated | — |

Notes:
MTES = Methyltriethoxysilane
TEOS = Tetraethoxysilane
DMDES = Dimethyldiethoxysilane
THMAM = Tris(hydroxymethyl)aminomethane
PEGDME = Polyethylene glycol dimethyl ether
PGME = Propylene glycol monomethyl ether

TABLE 5

|  | Example 10 | Example 11 | Example 12 |
|---|---|---|---|
| Fluid, silica precursor (A) |  |  |  |
| Alkoxysilane (molar ratio) | MTES/TEOS = 40/60 | MTES/TEOS = 40/60 | MTES/TEOS = 80/20 |
| Acid catalyst | Phosphoric acid | Phosphoric acid | Phosphoric acid |
| Molar amount (per mole of Si atoms) | 0.006 | 0.006 | 0.006 |
| Weight average molecular weight | 2,550 | 2,550 | 31,500 |
| Basic compound (B) |  |  |  |
| Type of basic compound | NaOH | NaOH | TPAH |
| pH | 13.1 | 13.1 | 13.0 |
| Vapor pressure (kPa) | Substantially zero | Substantially zero | Substantially zero |
| Molar amount (per mole of Si atoms) | 0.016 | 0.016 | 0.10 |
| Organic compound (C) |  |  |  |
| Type of organic compound | GTA | SOA | PVME |
| Molar amount (per mole of Si atoms) | 0.78 | 0.78 | 1.0 |
| Boiling point (° C.) | 258 | No boiling point | No boiling point |
| Number of OH groups per molecule | 3 | 8 | — |
| Oxygen/carbon atomic ratio | 0.67 | 0.68 | — |
| Coating composition |  |  |  |
| Solvent (D) (coating solvent) (molar ratio) | Water/PGME/MIBK = 20/50/30 | Water/PGME/MIBK = 20/50/30 | PGME/MIBK = 20/80 |
| Thin film forming conditions |  |  |  |
| Substrate | PET | PET | PET |
| Curing temperature (° C.) | 120 | 120 | 120 |
| Curing time (sec) | 120 | 120 | 120 |

TABLE 5-continued

|  | Example 10 | Example 11 | Example 12 |
|---|---|---|---|
| Extraction solvent (molar ratio) | Water/EtOH = 50/50 | Water/EtOH = 50/50 | Water/acetone = 20/80 |
| Immersion time (sec) | 30 | 30 | 30 |
| Properties of thin film |  |  |  |
| Reflectance (%) | 0.15 | 0.10 | 0.10 |
| Haze (%) | 0.68 | 0.73 | 0.98 |
| Pencil hardness | H | H | HB |

Notes:
MTES = Methyltriethoxysilane
TEOS = Triethoxysilane
TPAH = Tetrapropylammonium hydroxide
GTA = Glyceryl triacetate
SOA = Sucrose ocatacetate
PVME = Polyvinymethyl ether
PGME = Propylene glycol monomethyl ether
MIBK = Methyl isobutyl ketone

TABLE 6

|  | Example 13 | Example 14 | Comparative Example 11 |
|---|---|---|---|
| Fluid, silica precursor (A) |  |  |  |
| Alkoxysilane (molar ratio) | MTES/TEOS = 40/60 | MTES/TEOS = 40/60 | MTES/TEOS = 40/60 |
| Acid catalyst | Phosphoric acid | Phosphoric acid | Phosphoric acid |
| Molar amount (per mole of Si atoms) | 0.006 | 0.006 | 0.006 |
| Weight average molecular weight | 2,550 | 2,550 | 2,550 |
| Basic compound (B) |  |  |  |
| Type of basic compound | NaOH | NaOH | NaOH |
| pH | 13.1 | 13.1 | 13.1 |
| Vapor pressure (kPa) | Substantially zero | Substantially zero | Substantially zero |
| Molar amount (per mole of Si atoms) | 0.016 | 0.016 | 0.016 |
| Organic compound (C) |  |  |  |
| Type of organic compound | PEGDME | PEGDME | DME |
| Molar amount (per mole of Si atoms) | 1.0 | 1.0 | 3.0 |
| Boiling point (° C.) | No boiling point | No boiling point | 85 |
| Number of OH groups per molecule | — | — | 2 |
| Oxygen/carbon atomic ratio | — | — | 0.5 |
| Coating composition |  |  |  |
| Solvent (D) (coating solvent) (molar ratio) | Water/PGME/MIBK = 20/50/30 | Water/PGME/MIBK = 20/50/30 | Water/PGME/MIBK = 20/50/30 |
| Thin film forming conditions |  |  |  |
| Substrate | PET | PET | PET |
| Curing temperature (° C.) | 120 | 120 | 120 |
| Curing time (sec) | 120 | 120 | 120 |
| Extraction solvent (molar ratio) | Water/EtOH = 50/50 | Water/EtOH = 50/50 | Water/EtOH = 50/50 |
| Immersion time (sec) | 120 | 600 | 30 |
| Properties of thin film |  |  |  |
| Reflectance (%) | 0.8 | 0.3 | 3.4 |
| Haze (%) | 0.95 | 0.94 | 0.68 |
| Pencil hardness | H | H | 2H |

Notes:
MTES = Methyltriethoxysilane
TEOS = Triethoxysilane
PEGDME = Polyethylene glycol dimetyl ether
DME = 1,2-dimethoxyethane
PGME = Propylene glycol monomethyl ether
MIBK = Methyl isobutyl ketone

TABLE 7

|  | Example 15 | Example 16 | Example 17 | Example 18 | Example 19 |
|---|---|---|---|---|---|
| Fluid, silica precursor (A) | | | | | |
| Alkoxysilane (molar ratio) | MTES/TEOS = 78/22 | MTES/TEOS = 78/22 | MTES/TEOS = 78/22 | MTES/TEOS = 78/22 | MTES/TEOS = 78/22 |
| Acid catalyst | Ion exchange resin RCP160 | Ion exchange resin RCP160 | Ion exchange resin RCP160 | Ion exchange resin RCP160 | Ion exchange resin RCP160 |
| Molar amount (per mole of Si atoms) | 0.019 | 0.019 | 0.019 | 0.019 | 0.019 |
| Weight average molecular weight | 7,600 | 7,600 | 7,600 | 7,600 | 7,600 |
| Basic compound (B) | | | | | |
| Type of basic compound | TPAH | TPAH | TPAH | TPAH | TPAH |
| pH | 13.0 | 13.0 | 13.0 | 13.0 | 13.0 |
| Vapor pressure (kPa) | Substantially zero | Substantially zero | Substantially zero | Substantially zero | Substantially zero |
| Molar amount (per mole of Si atoms) | 0.10 | 0.0016 | 0.012 | 0.077 | 0.13 |
| Organic compound (C) | | | | | |
| Type of organic compound | PEGDME | PEGDME | PEGDME | PEGDME | PEGDME |
| Molar amount (per mole of Si atoms) | 1.0 | 1.0 | 1.0 | 1.0 | 1.0 |
| Coating composition | | | | | |
| Solvent (D) (coating solvent) (molar ratio) | PGME/MIBK = 20/80 | PGME/MIBK = 20/80 | PGME/MIBK = 20/80 | PGME/MIBK = 20/80 | PGME/MIBK = 20/80 |
| Thin film forming condition | | | | | |
| Substrate | PET | PET | PET and silicon wafer | PET and silicon wafer | Silicon wafer |
| Properties of thin film | | | | | |
| Reflectance (%) | 0.15 | 0.5 | 0.15 | 0.15 | — |
| Refractive index (1.95 eV) | — | — | 1.21 | 1.21 | 1.27 |
| Haze (%) | 0.92 | 0.88 | 0.81 | 0.95 | — |
| Pencil hardness | HB | H | H | H | — |

Notes:
MTES = Methyltriethoxysilane
TEOS = Tetraethoxysilane
TPAH = Tetrapropylammonium hydroxide
PEGDME = Polyethylene glycol dimethyl ether
PGME = Propylene glycol monomethyl ether
MIBK = Methyl isobutyl ketone

TABLE 8

|  | Example 20 | Example 21 | Example 22 | Example 23 | Example 24 |
|---|---|---|---|---|---|
| Fluid, silica precursor (A) | | | | | |
| Alkoxysilane (molar ratio) | MTES/TEOS = 78/22 | MTES/TEOS = 80/20 | MTES/TEOS = 80/20 | MTES/TEOS = 80/20 | MTES/TEOS = 80/20 |
| Acid catalyst | Ion exchange resin RCP160 | Phosphoric acid | Phosphoric acid | Phosphoric acid | Phosphoric acid |
| Molar ratio (per mole of Si atoms) | 0.019 | 0.006 | 0.006 | 0.006 | 0.006 |
| Weight average molecular weight | 7,600 | 31,400 | 31,400 | 31,400 | 31,400 |
| Basic compound (B) | | | | | |
| Type of basic compound | TPAH | TPAH | TPAH | TPAH | TPAH |
| pH | 13.0 | 13.0 | 13.0 | 13.0 | 13.0 |

TABLE 8-continued

| | Example 20 | Example 21 | Example 22 | Example 23 | Example 24 |
|---|---|---|---|---|---|
| Vapor pressure (kPa) | Substantially zero | Substantially zero | Substantially zero | Substantially zero | Substantially zero |
| Molar amount (per mole of Si atoms) | 0.20 | 0.035 | 0.077 | 0.17 | 0.20 |
| Organic compound (C) | | | | | |
| Type of organic compound | PEGDME | PEGDME | PEGDME | PEGDME | PEGDME |
| Molar amount (per mole of Si atoms) | 1.0 | 1.0 | 1.0 | 1.0 | 1.0 |
| Coating composition | | | | | |
| Solvent (D) (coating solvent) (molar ratio) | PGME/MIBK = 20/80 | PGME/MIBK = 20/80 | PGME/MIBK = 20/80 | PGME/MIBK = 20/80 | PGME/MIBK = 20/80 |
| Thin film forming condition | | | | | |
| Substrate | Silicon wafer | PET and silicon wafer | PET and silicon wafer | PET and silicon wafer | PET and silicon wafer |
| Properties of thin film | | | | | |
| Reflectance (%) | — | 0.10 | 0.15 | 0.25 | 0.35 |
| Refractive index (1.95 eV) | 1.31 | 1.21 | 1.21 | 1.30 | 1.32 |
| Haze (%) | — | 0.83 | 0.92 | 0.97 | 0.89 |
| Pencil hardness | — | H | H | HB | HB |

Notes:
MTES = Methyltriethoxysilane
TEOS = Tetraethoxysilane
TPAH = Tetrapropylammonium hydroxide
PEGDME = Polyethylene glycol dimethyl ether
PGME = Propylene glycol monomethyl ether
MIBK = Methyl isobutyl ketone

INDUSTRIAL APPLICABILITY

By using the coating composition of the present invention, it becomes possible to form on a substrate a porous silica thin film having a low refractive index, a high light transmittance and a high strength. The porous silica thin film can be advantageously used as an antireflection film for coating an optical part, a lens (e.g., lenses of glasses) or a display screen.

The invention claimed is:

1. A coating composition comprising:
a fluid, silica precursor (A) obtained by subjecting at least one alkoxysilane to hydrolysis and polycondensation in the presence of an acid catalyst,
said alkoxysilane being selected from the group consisting of first alkoxysilanes, each independently represented by the following formula (1):

$$R^1{}_n Si(OR^2)_{4-n} \quad (1)$$

wherein each $R^1$ independently represents a hydrogen atom, a $C_1$–$C_{10}$ alkyl group, a $C_6$–$C_{10}$ aryl group, a vinyl group, a $C_3$–$C_{10}$ organic group having a vinyl group, a $C_4$–$C_{10}$ organic group having a (meth)acryloyl group or a $C_3$–$C_{10}$ organic group having an epoxy group, each $R^2$ independently represents a $C_1$–$C_6$ alkyl group, and n represents an integer of from 0 to 2,
and second alkoxysilanes, each independently represented by the following formula (2):

$$(R^3O)_3 Si\text{—}(R^4)_m\text{—}Si(OR^3)_3 \quad (2)$$

wherein each $R^3$ independently represents a $C_1$–$C_6$ alkyl group, $R^4$ represents a $C_1$–$C_6$ alkylene group or a $C_6$–$C_{10}$ arylene group, and m represents 0 or 1,
a basic compound (B) having at least one member selected from the group consisting of a basic hydroxyl group and a basic nitrogen atom, wherein the pH of a 0.1 N aqueous solution of said basic compound (B) is 11 or more, and the vapor pressure of said basic compound (B) is 1.3 kPa or lower as measured at 100° C., and
an organic compound (C) having a boiling point of 100° C. or higher, said organic compound (C) being compatible with said fluid, silica precursor (A),
wherein the amount of said basic compound (B) is from 0.0015 to 0.5 mol, in terms of the total molar amount of said basic hydroxyl groups and said basic nitrogen atoms in said basic compound (B), per mole of Si atoms contained in said fluid, silica precursor (A).

2. The coating composition according to claim 1, wherein said fluid, silica precursor (A) has a weight average molecular weight of from 1,500 to 200,000.

3. The coating composition according to claim 1, wherein said organic compound (C) has at least one group selected from the group consisting of an ether group, an ester group, a carbonyl group, a carboxyl group, a carbonate group, an amide group and a hydroxyl group.

4. The coating composition according to claim 3, wherein said organic compound (C) is a polyhydric alcohol or a saccharide, each of which has at least three hydroxyl groups, or an ester obtained by esterifying at least one of the hydroxyl groups of said polyhydric alcohol or saccharide.

5. The coating composition according to claim 4, wherein, in said organic compound (C), which is a polyhydric alcohol, a saccharide or an ester, the atomic ratio of oxygen to carbon is 0.5 or more.

6. The coating composition according to claim 3, wherein said organic compound (C) is at least one polymer selected from the group consisting of a polyether, a polyester, a polycarbonate, a polyamide, cellulose, a polyvinyl alcohol, a polyvinyl ether, a polyvinylpyrrolidone, a polyacrylamide and a polyacrylic acid.

7. The coating composition according to claim 1, wherein said acid catalyst is a cation exchange resin.

8. The coating composition according to claim 1, wherein said basic compound (B) is at least one compound selected from the group consisting of sodium hydroxide, potassium hydroxide, a tetraalkylammonium hydroxide, and a polyalkyleneimine having a weight average molecular weight of 130 or more.

9. The coating composition according to claim 1, wherein the amount of said basic compound (B) is from 0.005 to 0.08 mol, in terms of the total molar amount of said basic hydroxyl groups and said basic nitrogen atoms in said basic compound (B), per mole of Si atoms contained in said fluid, silica precursor (A).

10. The coating composition according to claim 1, which further comprises a solvent (D) for a mixture of said fluid, silica precursor (A), said basic compound (B) and said organic compound (C).

11. The coating composition according to claim 10, wherein said solvent (D) comprises a high boiling point solvent having a hydroxyl group and having a boiling point of 100° C. or higher in an amount of 5% by weight or more, based on the weight of said coating composition.

12. The coating composition according to claim 1, which further comprises a tetraalkylammonium salt (E) in an amount of from 1 to 50 parts by weight, relative to 100 parts by weight of said fluid, silica precursor (A).

13. The coating composition according to any one of claims 1 to 12, which is for use in forming an antireflection film.

14. A porous silica thin film obtained by a method comprising the steps of:
 (1) applying the coating composition of claim 1 onto a substrate to form a thin film of the composition on the substrate, said thin film comprising said fluid, silica precursor (A) having dispersed therein said basic compound (B) and said organic compound (C),
 (2) curing said thin film to obtain a cured thin film in which said fluid, silica precursor (A) has been converted to silica, and
 (3) subjecting said cured thin film to an extraction with a solvent to remove said organic compound (C) from the cured thin film, thereby obtaining a porous silica thin film.

15. The porous silica thin film according to claim 14, wherein said solvent used for the extraction in the step (3) is a polar solvent.

* * * * *